Aug. 7, 1956  J. T. MacISAAC, JR  2,757,624
SHEET HEMMING AND HEMSTITCHING APPARATUS
Filed Oct. 21, 1953  12 Sheets-Sheet 4
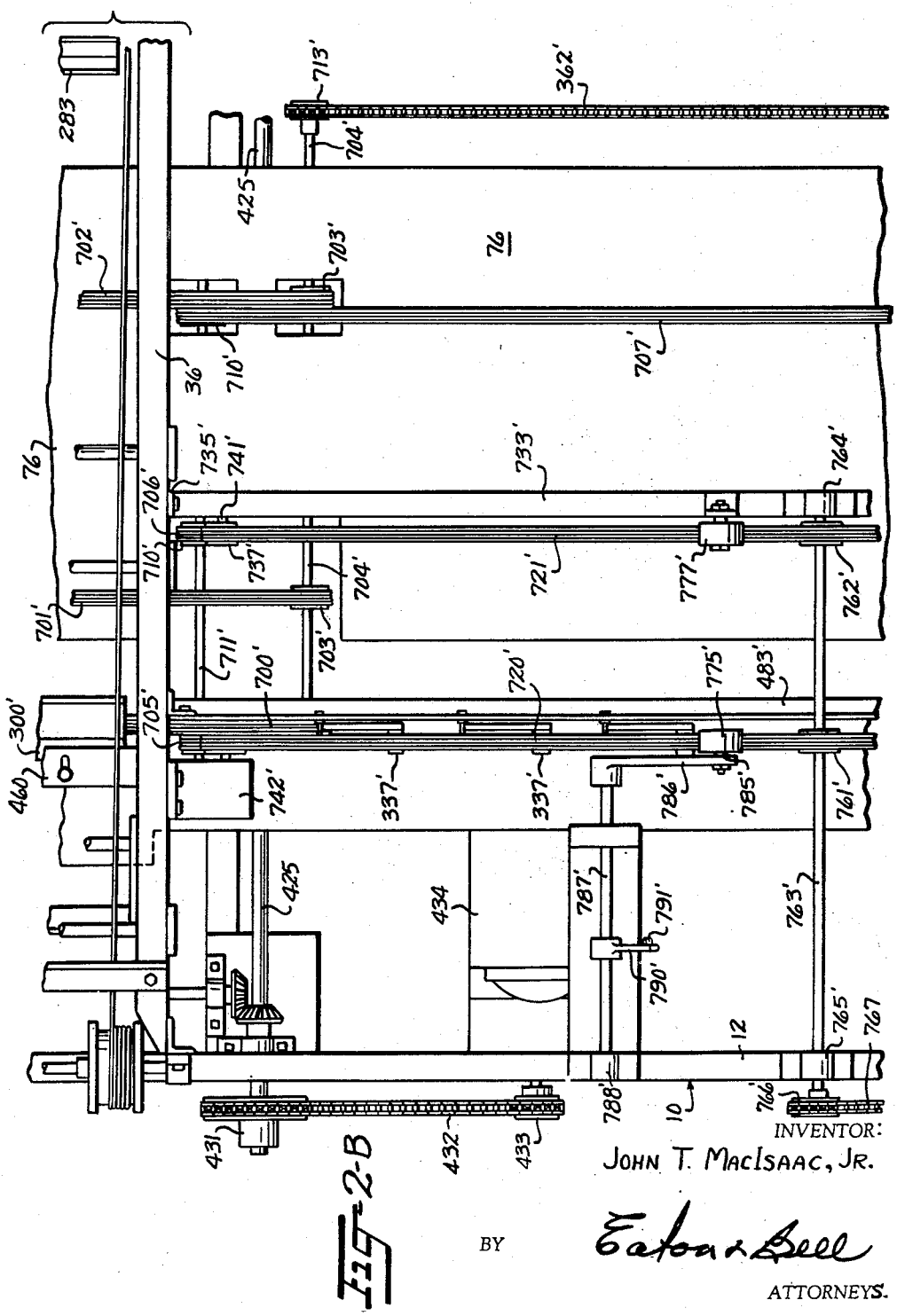
Fig-2-B
INVENTOR:
John T. MacIsaac, Jr.
BY Eaton & Bell
ATTORNEYS.

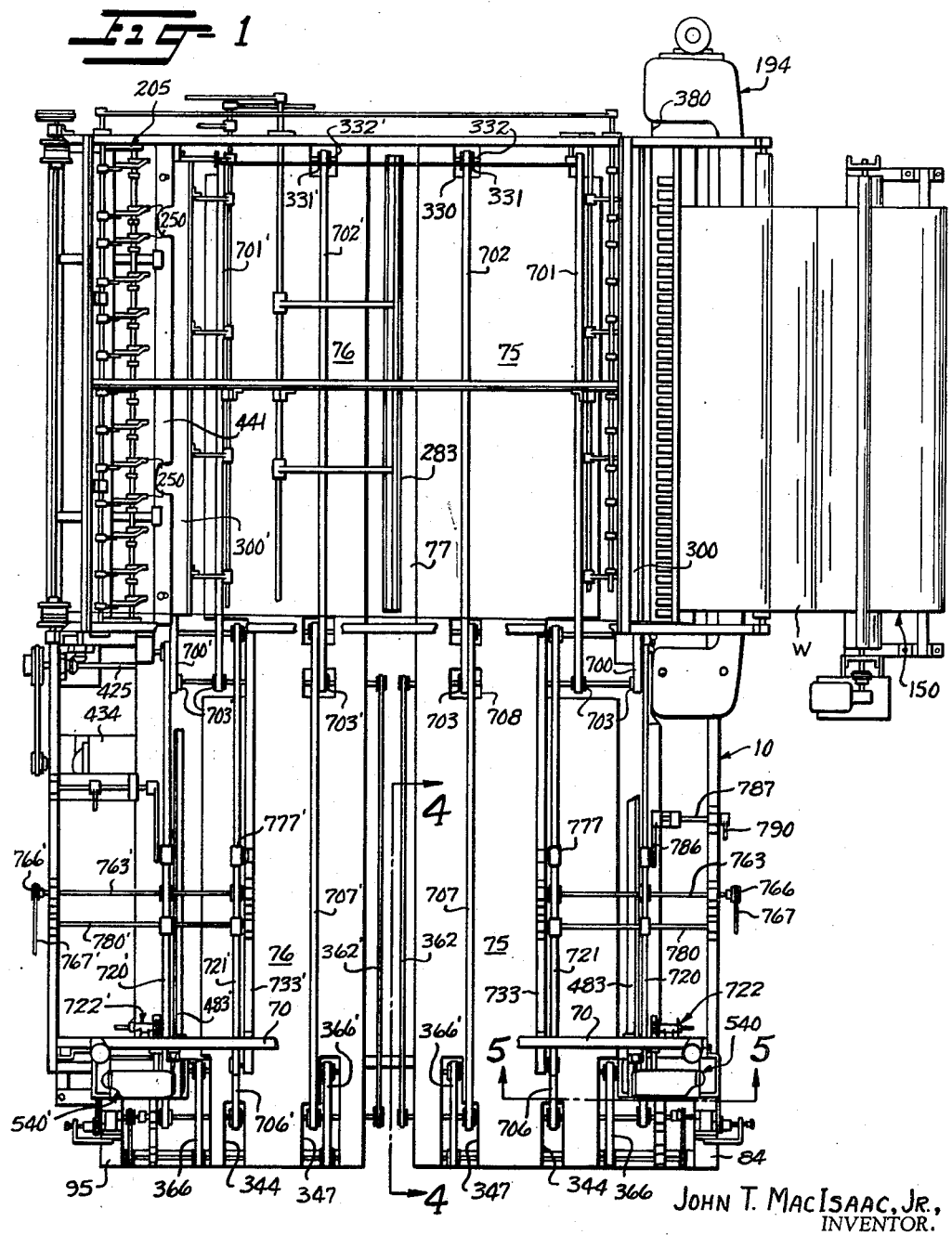

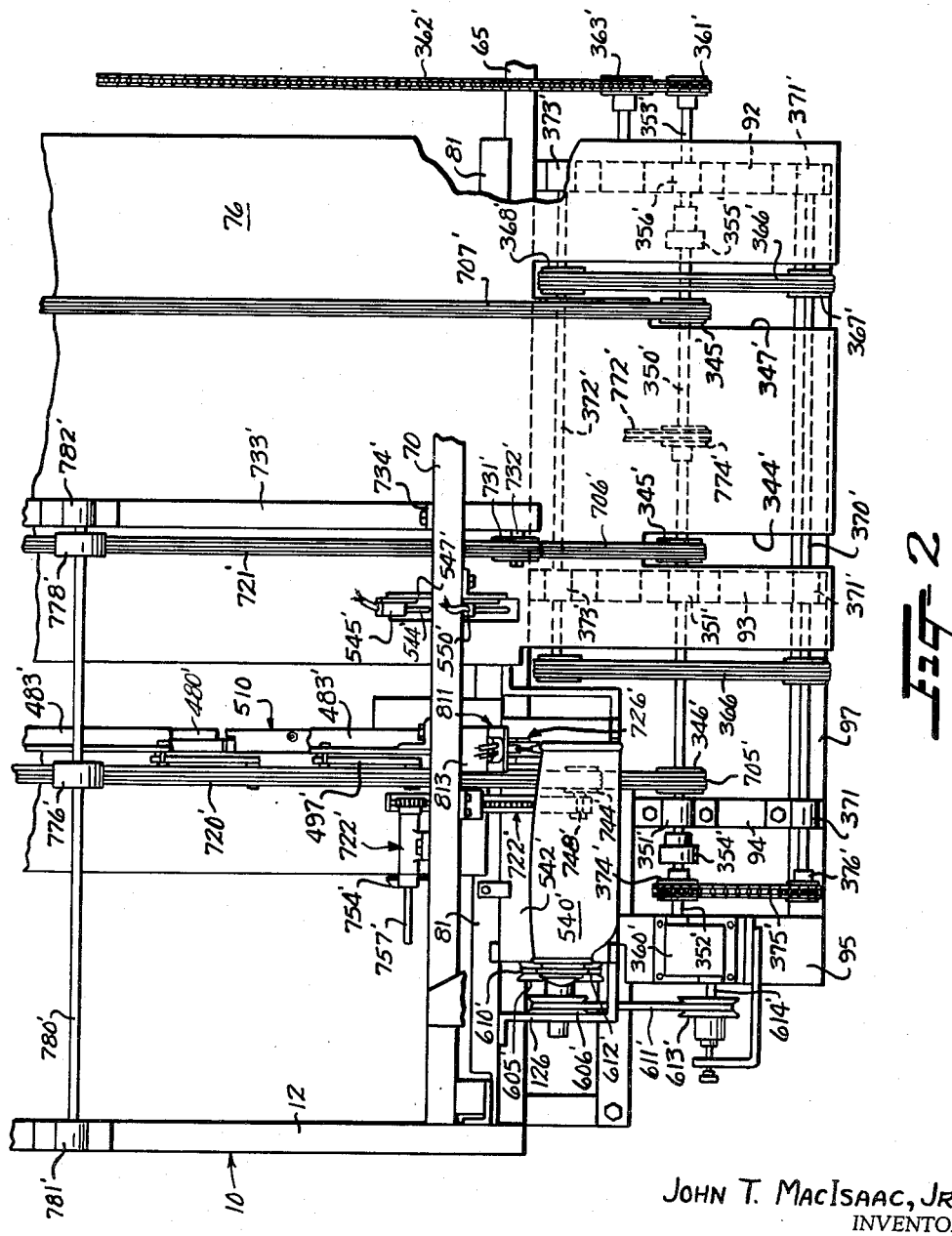

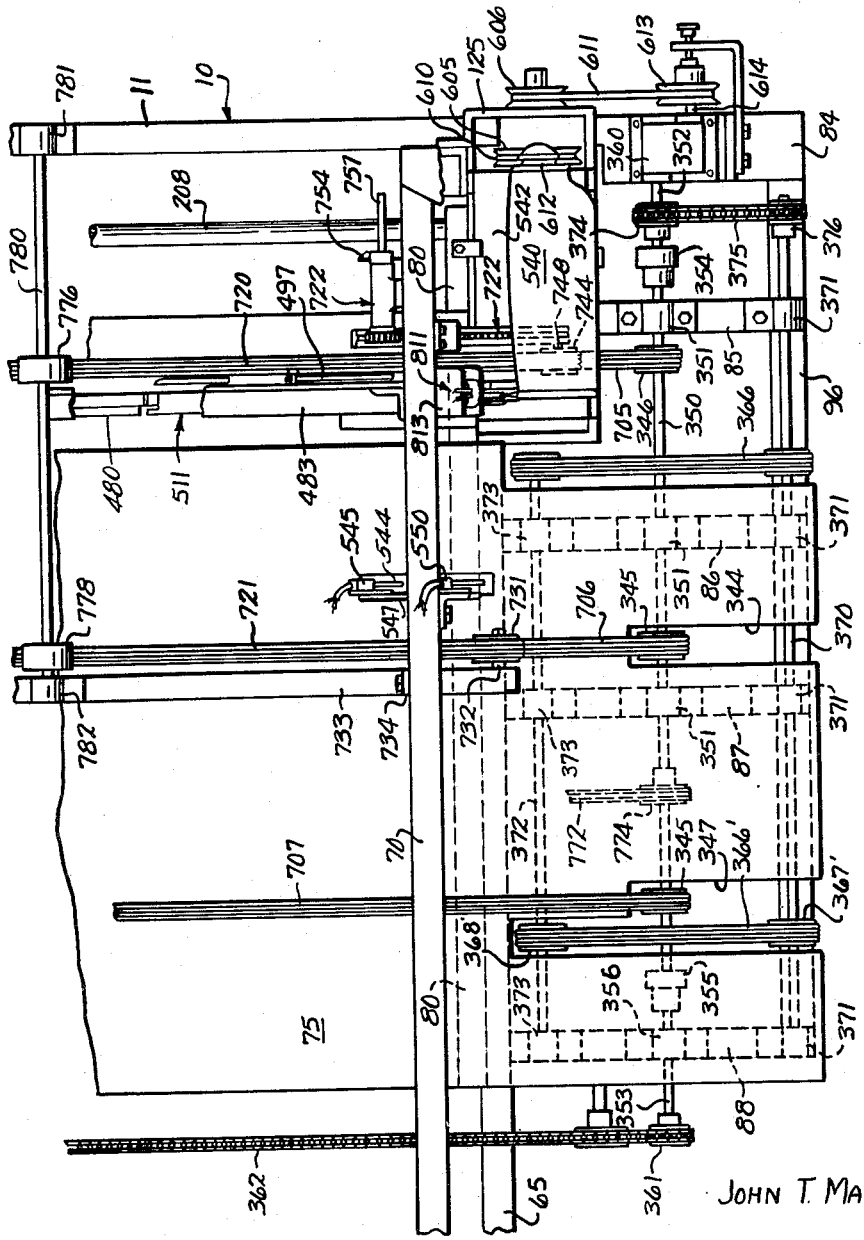

Aug. 7, 1956 J. T. MacISAAC, JR 2,757,624
SHEET HEMMING AND HEMSTITCHING APPARATUS
Filed Oct. 21, 1953 12 Sheets—Sheet 5
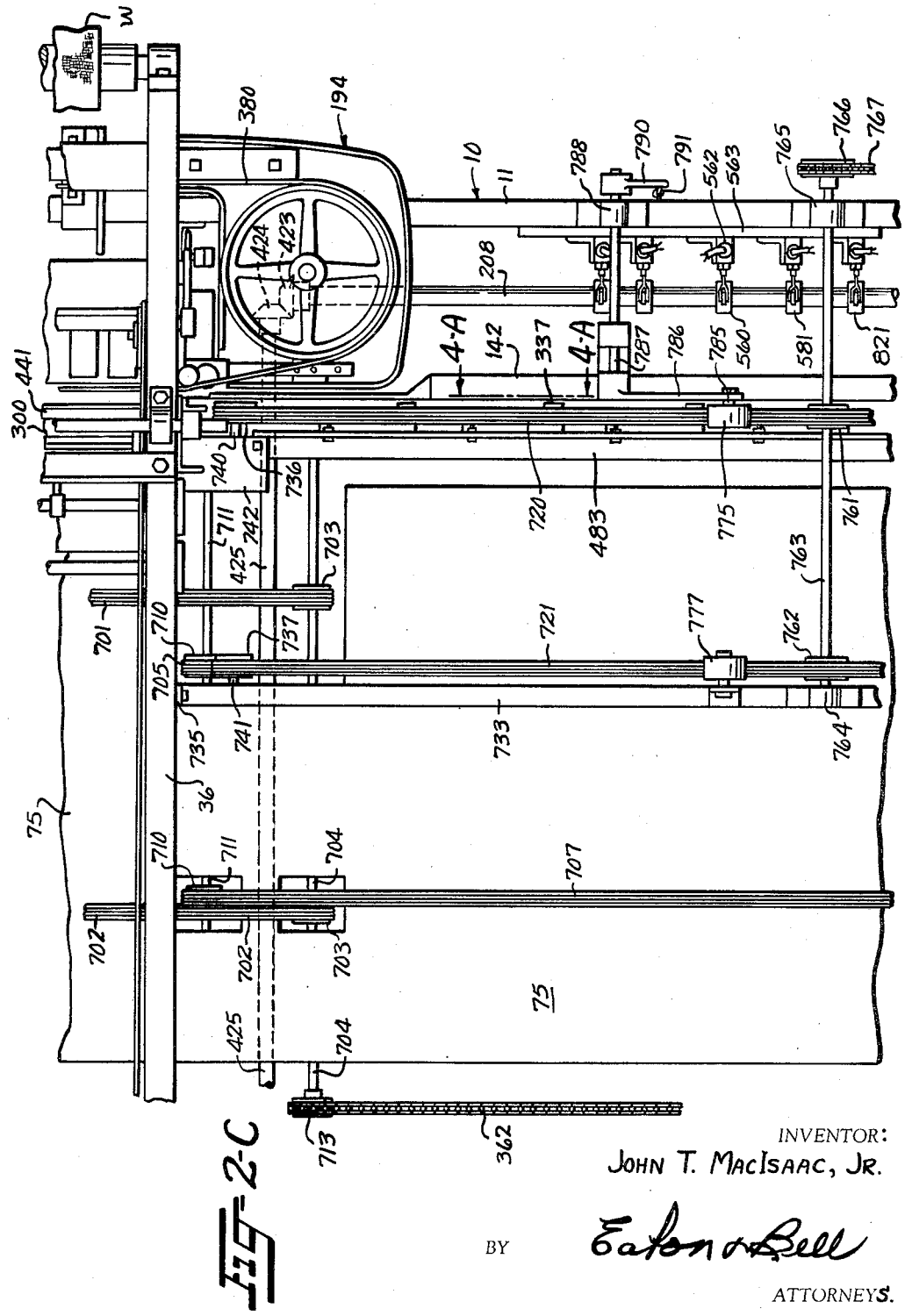
INVENTOR:
JOHN T. MACISAAC, JR.
BY *Eaton & Bell*
ATTORNEYS.

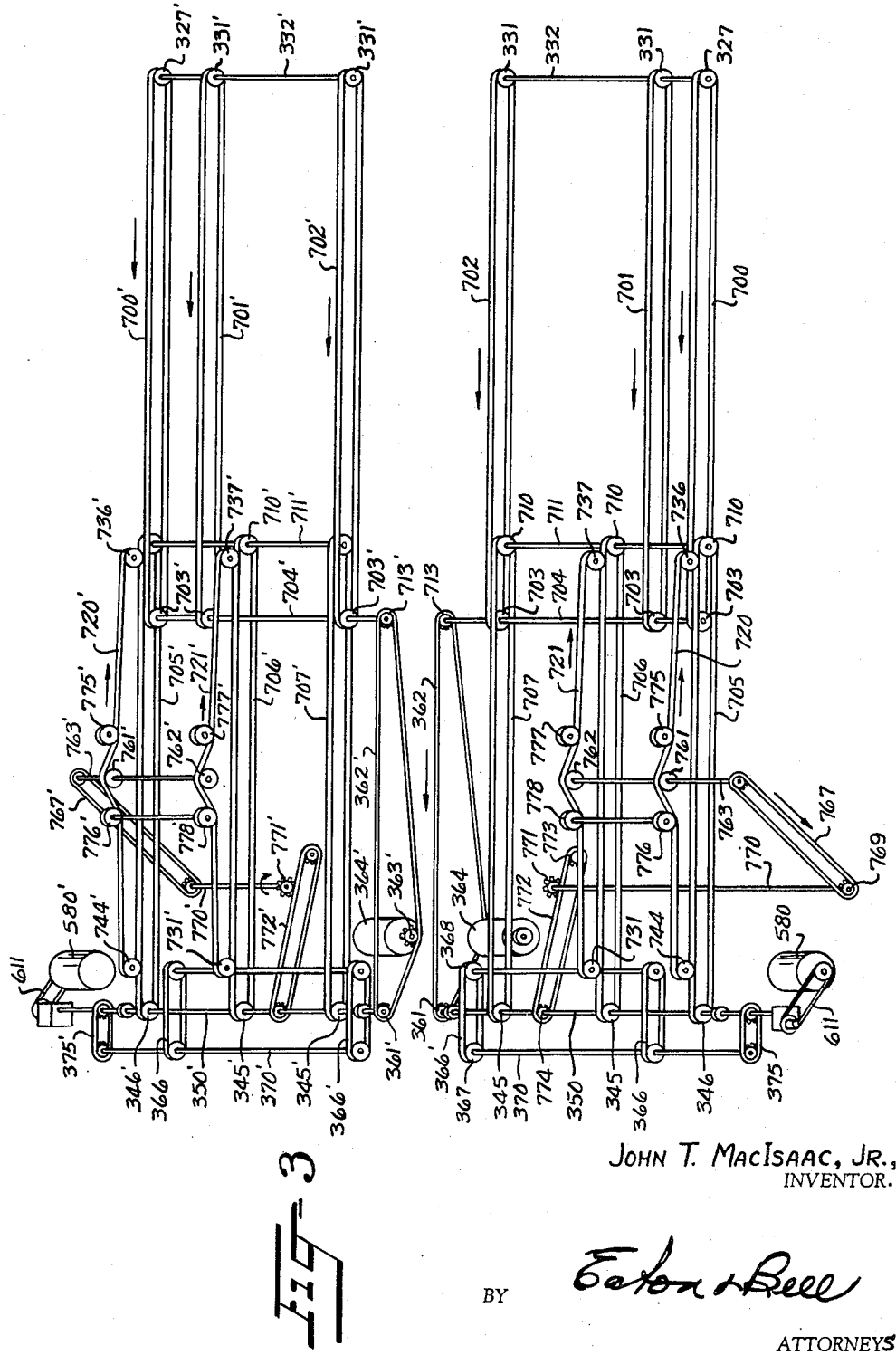

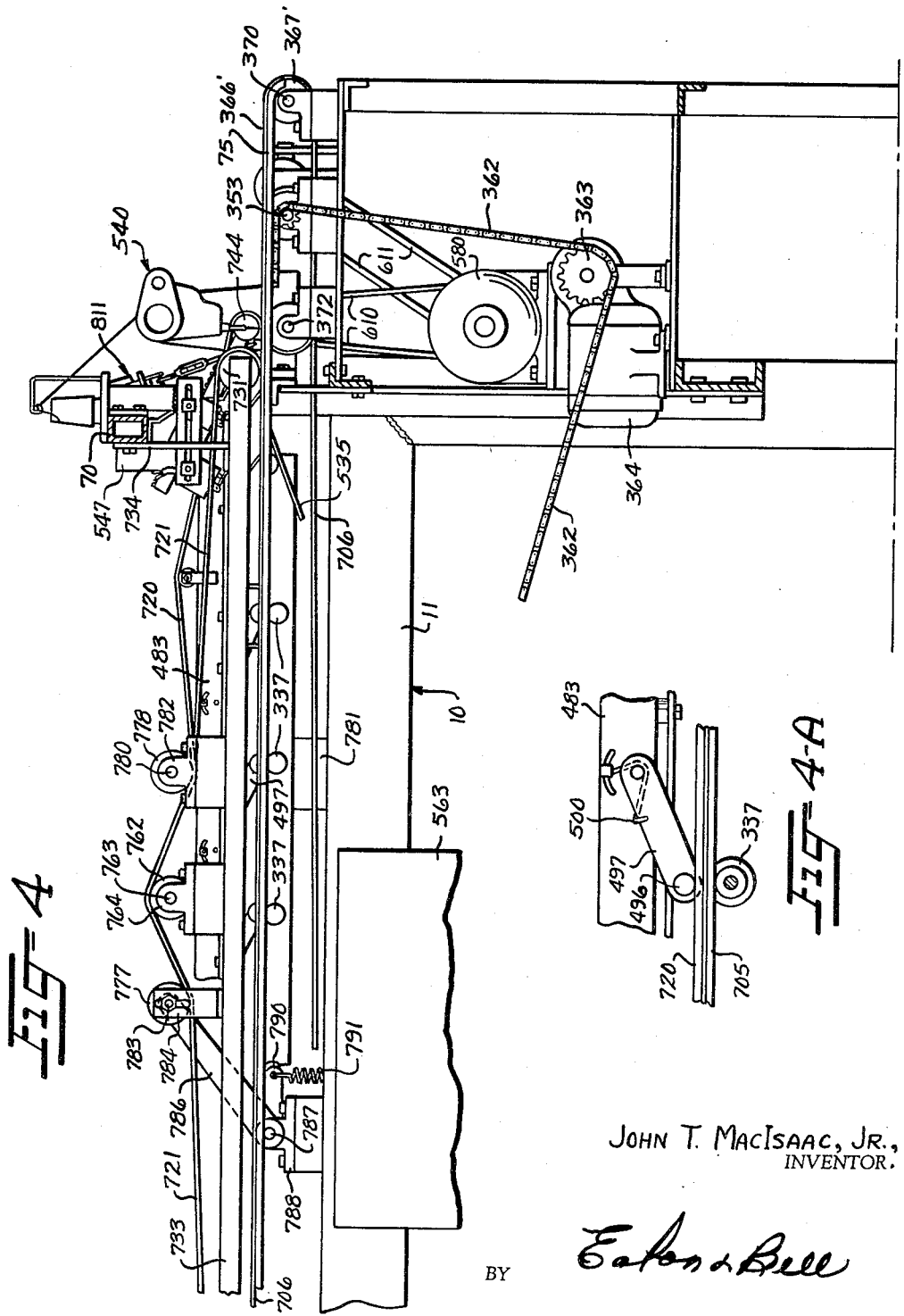

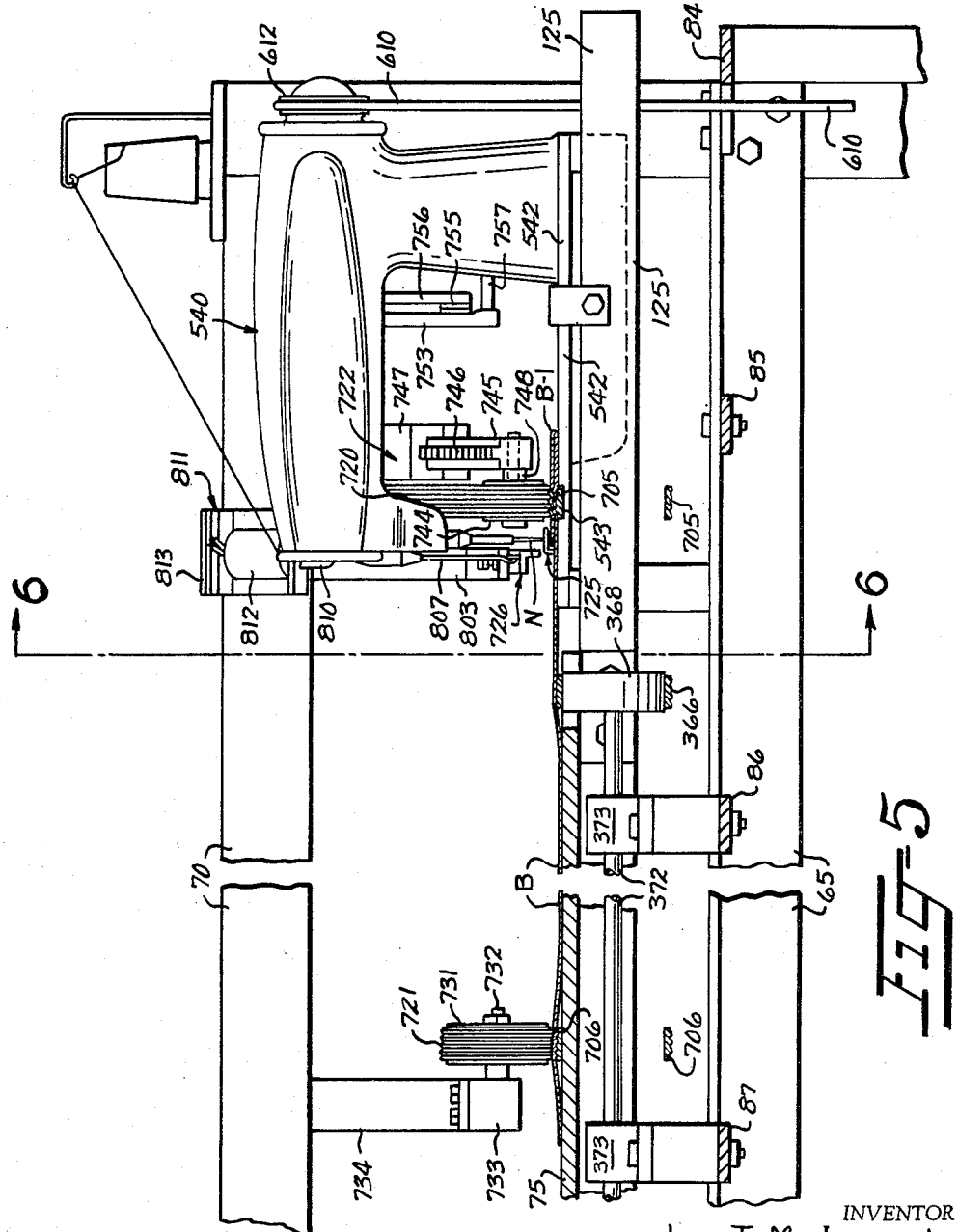

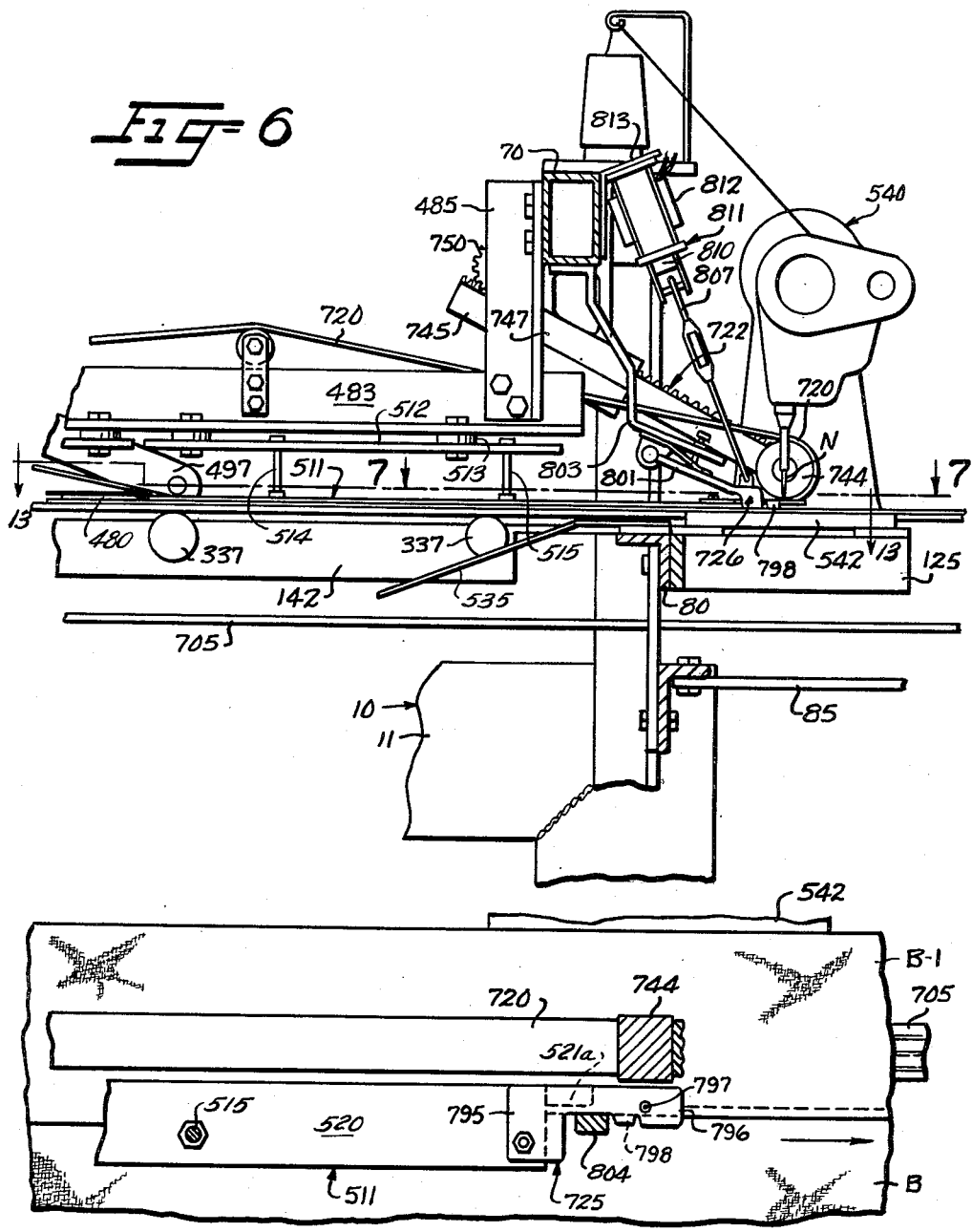

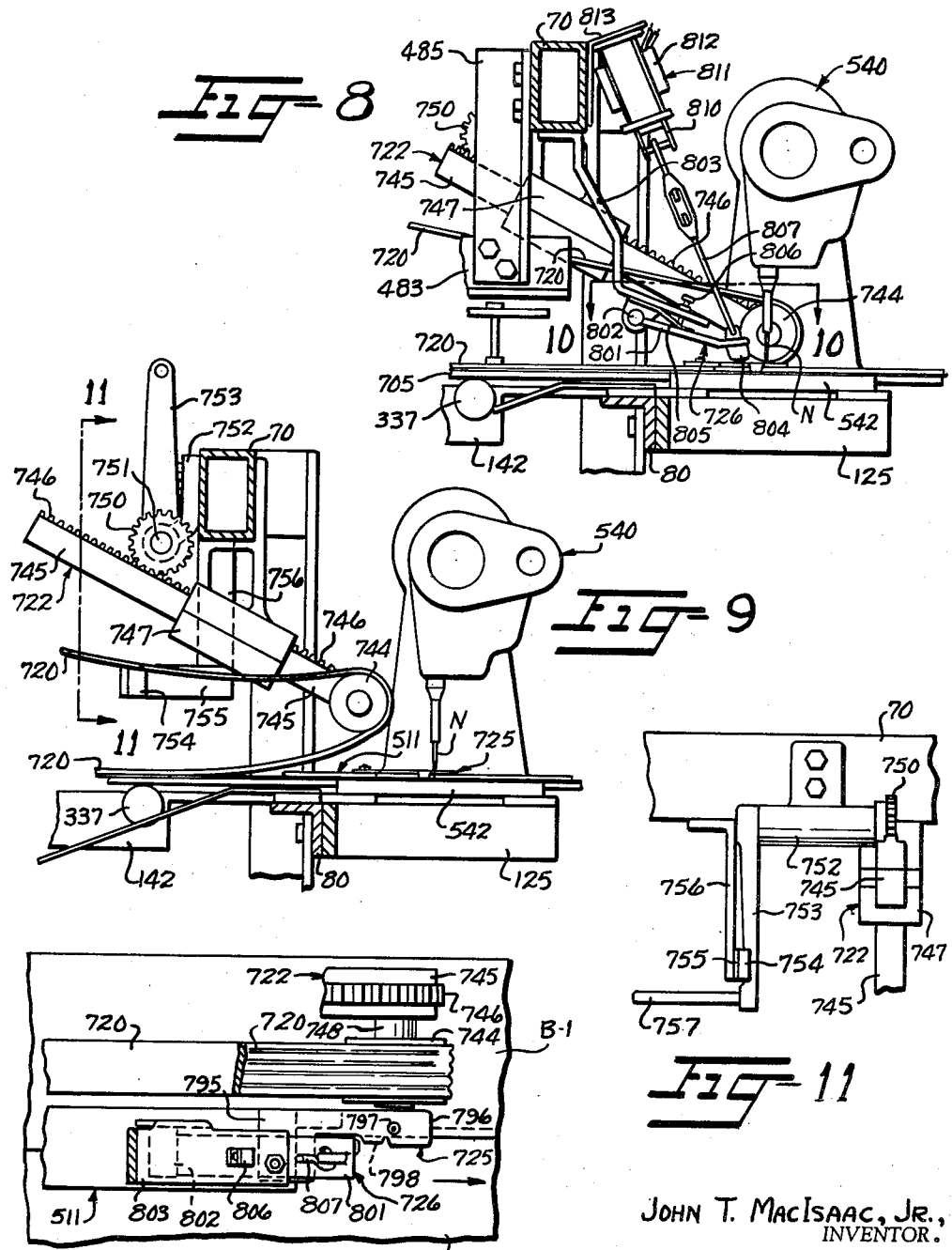

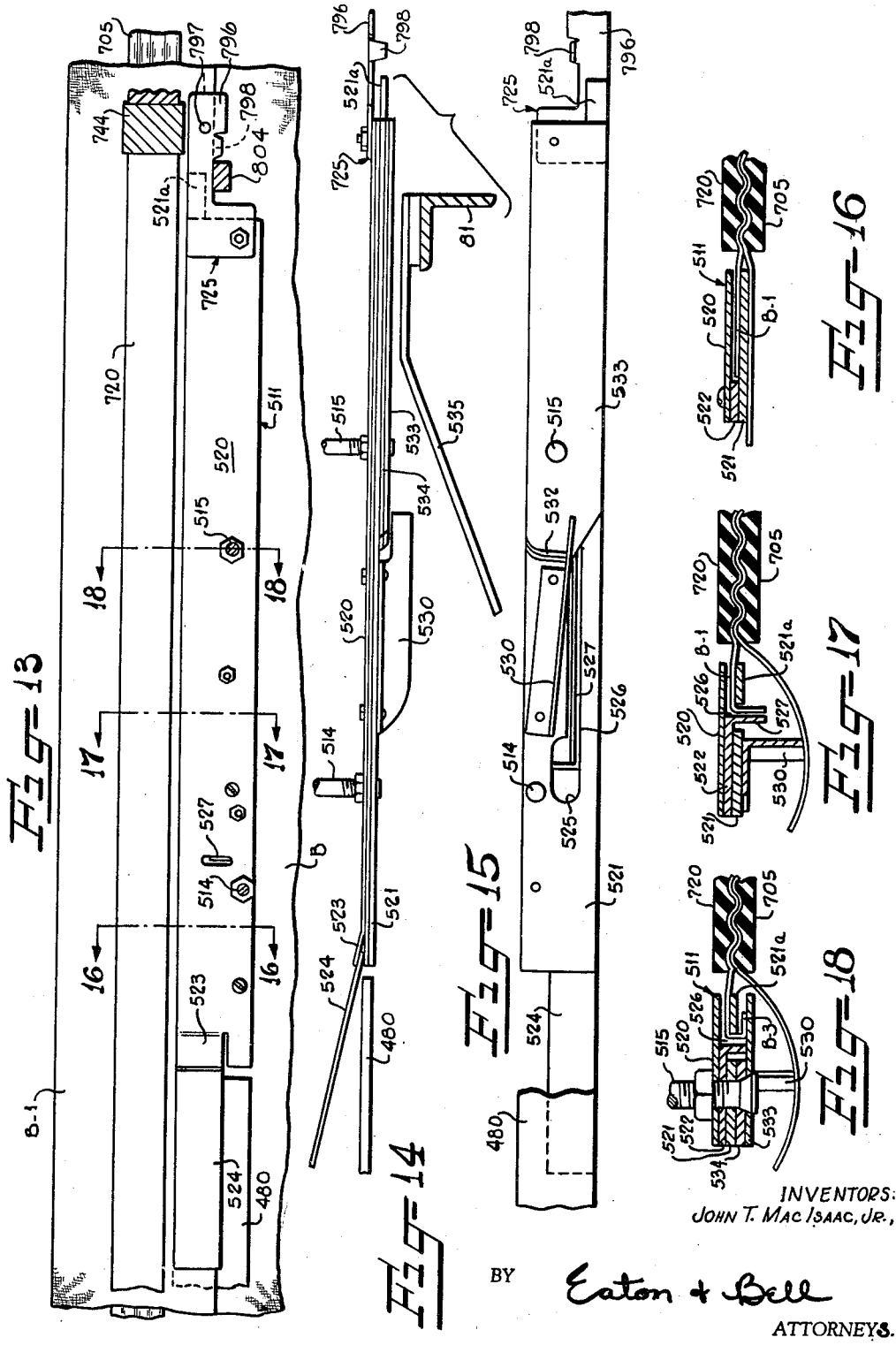

United States Patent Office 2,757,624
Patented Aug. 7, 1956

2,757,624

SHEET HEMMING AND HEMSTITCHING APPARATUS

John T. MacIsaac, Jr., Spray, N. C., assignor to Fieldcrest Mills, Inc., Spray, N. C., a corporation of Delaware Application October 21, 1953, Serial No. 387,433

19 Claims. (Cl. 112—2)

This invention relates to apparatus for successively severing blanks from pliable web material and for forming hems at each severed end of each blank and then stitching the same, and it is the primary object of this invention to provide an improved means for feeding each successive blank, after it is severed from a sheet of web material, during the folding of hems on the respective severed ends of the blank and, also, during the movement of the folded hems of the blank through separate stitching or sewing machines.

This invention is particularly concerned with improvements in apparatus of the type disclosed in the co-pending application of myself and Robert L. Self, Serial No. 291,659, filed June 4, 1952, and entitled Apparatus for Making Bed Sheets and the Like.

The apparatus disclosed in said co-pending application includes a plurality of spaced substantially parallel carrier belts forming substantially continuous top belt runs which extend longitudinally of the apparatus and across and above portions of which a web material is drawn, after which it is severed to form a blank and whereupon the opposite raw edges or severed ends of the blank are partially folded. Thereafter, movement is imparted to the top belt runs for moving the blank and guiding the hems toward respective sewing machines in the course of which the hems are underfolded. Now, the outermost of said top belt runs support and impart movement to the main or first folded edge portions of each successive blank while the marginal portions of previously overlapping folded portions of a blank are underfolded during which the upper surface of each fold is engaged by the bottom run of a corresponding idler pressure applying belt to which movement is imparted by the top run of the corresponding carrier belt therebeneath and through the frictional contact effected, between the complementary runs of the pressure applying belts and the carrier belts, by the corresponding portions of the blank disposed therebetween.

With continued use of the machine disclosed in said co-pending application, it has been found that the central portion of each blank tends to bow during the course of movement thereof toward the sewing machines so that the folded hems thereof are advanced by the corresponding carrier belts and pressure applying belts ahead of the central portion thereof thus resulting in "ears" being formed at the leading edge of each fold; that is, the innermost corner of each fold would be disposed in advance of the portions of the body of the blank disposed therebeneath. Of course, this would also cause the trailing edge of each overfolded hem portion to extend outwardly or rearwardly at an angle relative to the trailing edge of the body portion of the blank, thus resulting in "seconds."

It is, therefore, another object of this invention to provide improved means for feeding or advancing each successive blank toward the sewing machines in such a manner as to obviate the formation of hems whose opposite leading and trailing edges are disposed at an angle relative to the body portion of the blank. To this end, independent means are provided for driving the pressure applying belts at a speed corresponding with that of the carrier belts and, further, an additional pressure applying belt is provided which is spaced inwardly from each of the outermost pressure applying belts and whose bottom run is disposed immediately above a portion of a corresponding top belt run of one of the carrier belts, all of the pressure applying belts and the carrier belts being driven at the same speed so that, although the centermost portion of each successive blank may bow rearwardly during the course of forward movement thereof, a relatively wide portion of each successive blank adjacent each folded edge thereof is forcefully propelled toward the sewing mechanisms or machines to insure that the leading and trailing edges of the hems are accurately alined with the corresponding leading and trailing edge portions of the blanks. Actually the carrier belts and pressure applying belts are driven by the same motors, but the pressure applying belts are driven through mechanical connections with said motors rather than by contact with the carrier belts or the blank or its hems passing between the carrier belts and pressure applying belts whereby the pressure applying belts are driven independently of the carrier belts.

In said co-pending application, the sewing machines are provided with presser feet adjacent which the sewing needles move in the course of the stitching operations and, since it is necessary that the presser feet of said co-pending application are moved to operative position prior to the leading edge of each successive blank reaching the same, it quite often happens that the presser feet cause the corresponding portions of the hem and the blank to wrinkle which also contributes to an uneven leading edge on each of the hems. In the improved apparatus, the usual type of presser feet are omitted and, in lieu thereof, stripper plates are provided on the front leading edges of the folding devices, which stripper plates extend over the hems and beneath the needles of the sewing machines and are provided with respective apertures therein through which the needles pass during the stitching operation. The foremost portions of the improved pressure applying belts above described extend forwardly to a point immediately adjacent the needles of the sewing machines to insure that the hems remain in proper relationship to the body of the blank during the stitching operation.

Means are also provided for raising and lowering the front portion of each of the pressure applying belts, adjacent the needles of the sewing machines, to facilitate repairing the sewing machines or replacing the needles thereof without the necessity of removing the pressure applying belts from the machine.

In order to prevent the blank body being advanced by the carrier belts ahead of the folds of the hems after the leading portion of each successive hem has been stitched, which has heretofore resulted in the trailing edge of each successive hem being disposed at an angle relative to the body of the blank, I have also provided a blank restraining or tensioning means disposed adjacent the needle of each of the sewing mechanisms or machines for frictionally clamping the body of the blank adjacent the hems against the bases of the sewing machines at a predetermined time after sewing of the leading portions of the hems are commenced so that the blank is placed under predetermined tension as the hems advance through the sewing machines, thereby insuring that the trailing edges of the hems are accurately alined with the corresponding trailing edge portions of the body of the blank.

Some of the objects of the invention having been stated, other objects will appear as the description proceeds when taken in connection with the accompanying drawings, in which—

Figure 1 is a top plan view of a sheet making machine of the character disclosed in said co-pending application embodying the improved means for feeding each successive blank toward and through the sewing machines during the forming of hems on opposite sides thereof and during the stitching of said hems and wherein many of the details of the machine are omitted due to the small scale at which the view is shown;

Figures 2 and 2–A are enlarged fragmentary plan views of the lower respective left-hand and right-hand portions of Figure 1;

Figures 2–B and 2–C are enlarged views of the central respective left-hand and right-hand portions of Figure 1 and are also extensions to the upper ends of respective Figures 2 and 2–A;

Figure 3 is a schematic perspective view showing the improved means for moving each successive blank transversely to the length of the web, after the web has been drawn across the machine and after the blank has been severed from the web, for passing the unhemmed or raw edges of the blank through the folding and stitching means;

Figure 4 is an enlarged fragmentary elevation, partially in section, taken substantially along line 4—4 in Figure 1 and showing parts of the improved means for feeding or advancing the blanks to and through the sewing machines;

Figure 12:
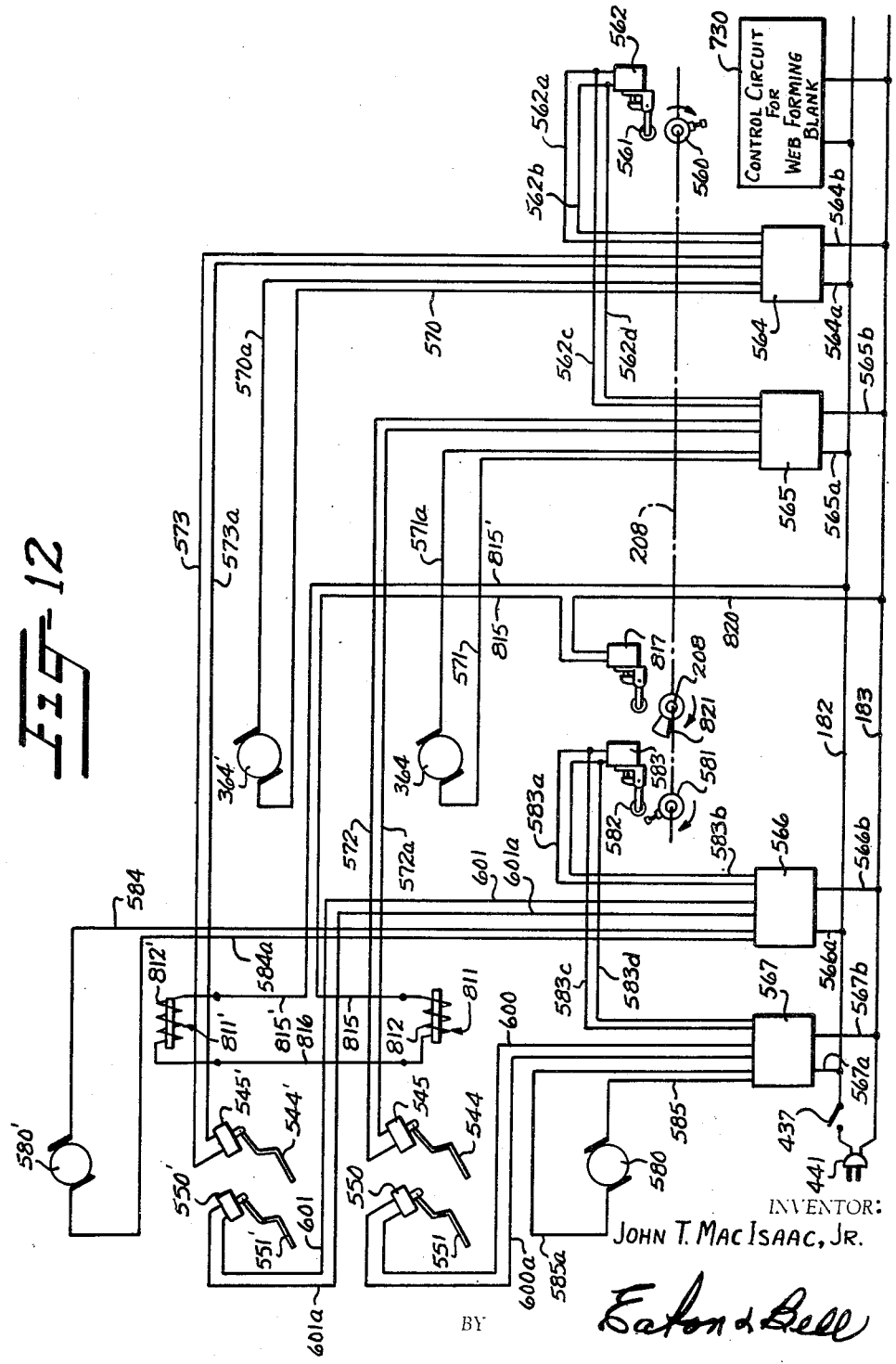

Figure 4–A is an enlarged fragmentary detail, looking substantially along line 4–A—4–A in Figure 2–C, showing the means for exerting downward pressure on the bottom runs of the pressure applying belts;

Figure 5 is an enlarged elevation, partially in section, taken substantially along line 5—5 in Figure 1 and showing the improved means for maintaining the folded end portions of the blank and the body of the blank in proper relationship as they move past the sewing machine needles;

Figure 6 is an enlarged elevation, partially in section, taken substantially along line 6—6 in Figure 5 and showing, in detail, the means for maintaining one of the overfolded hem portions of the blank and the body of the blank in proper relationship as they move past the needle of one of the sewing machines and also showing the means for maintaining the blank taut in operative position;

Figure 7 is an enlarged fragmentary plan view of the needle stripper means employed in lieu of the presser foot of each sewing machine for maintaining the adjacent edge of the hemmed blank in engagement with the base of the sewing machine during vertical reciprocation of the sewing needle, and taken along line 7—7 in Figure 6;

Figure 8 is a fragmentary view similar to the right-hand portion of Figure 6, but showing the blank restraining or tensioning means in raised or inoperative position rearwardly of the needle of the sewing machine;

Figure 9 is a view similar to Figure 8, but omitting the blank tensioning means in order to clearly illustrate the adjacent means for manually raising and lowering the front portion of the adjacent pressure applying belt and showing the latter means in retracted and raised position, in which position it is disposed during repairing of the sewing machine or replacement of the needle thereof;

Figure 10 is an enlarged fragmentary plan view, partially in section, taken substantially along line 10—10 in Figure 8, but omitting the needle and needle support of the sewing machine for purposes of clarity;

Figure 11 is a fragmentary elevation taken substantially along line 11—11 in Figure 9, but showing the hand lever for operating the corresponding pressure applying belt positioning and retracting means in a different position from that shown in Figure 9;

Figure 12 illustrates, diagrammatically, the electrical circuit for the machine, the electrically controlled elements being shown schematically;

Figure 13 is an enlarged fragmentary top plan view, with parts in section, looking substantially along line 13—13 in Figure 6, showing the means for underfolding the free edge of one of the overfolded portions previously formed by the folding means shown in the upper portions of Figures 2–B and 2–C, and also showing a portion of the web material as it passes therethrough;

Figure 14 is a fragmentary elevation looking at the lower side of Figure 13, but omitting the web material;

Figure 15 is an inverted plan view of the underfolding means at one side of the machine looking at the bottom of Figure 13;

Figure 16 is a fragmentary transverse vertical sectional view taken substantially along line 16—16 in Figure 13, showing the corresponding partially folded hem as it enters the folding means shown in Figure 13;

Figure 17 is an enlarged fragmentary vertical sectional view taken substantially along line 17—17 in Figure 13, showing how the web per se is moved away from the lower surfaces of the folding means and how the inner edge of the overlapping end portion is permitted to depend downwardly;

Figure 18 is an enlarged fragmentary transverse vertical sectional view taken substantially along line 18—18 in Figure 13, showing the underfolded portion at the inner edge of the corresponding hem as it is folded preparatory to passing through the stitching mechanism.

Referring generally to the drawings, with the exception of the improved means for guiding the opposite end edges of each successive blank toward and past the sewing machines; during the folding of the hems thereof and during the stitching of the hems, and the improved means for maintaining the portions of the blank adjacent the hems under predetermined tension after some stitches have been formed in the leading portion of each hem of each successive blank, and the stripper and guide means provided in lieu of the usual presser foot associated with each sewing machine, the machine shown in the drawings is substantially the same as that disclosed in said co-pending application, Serial Number 291,659. Therefore, where practicable, those parts of the machine shown in the annexed drawings which are identical or substantially the same as parts of the machine shown in said co-pending application, shall bear the same reference characters to enable the reader to clearly understand the present invention in comparing the structure shown in the annexed drawings with the structure shown in the drawings in said co-pending application.

Generally, the machine comprises a web roll support and let-off mechanism broadly designated at 150 from which a sheet of foldable web material or cloth W is intermittently withdrawn across and above the top runs of a first or rear group of spaced endless carrier belts, there being six such belts illustrated in the drawings (Figures 1, 2 to 2–C, inclusive, and 3), respectively designated at 700, 701, 702, 700', 701' and 702'. The sheet of web material W is drawn across and above said belts by means of a plurality of spaced grippers 250 having relatively movable jaws thereon which are automatically opened and closed as they are moved back and forth across the machine by means of a web feeding mechanism broadly designated at 205.

Each time a portion of the web material W is drawn across and above the first group of carrier belts, which are then stationary, a pair of blank clamping or hold-down plates 300, 300' move downwardly from a normally raised position and clamp the web material W against the upper runs of the outermost carrier belts 700, 700'. The hold-down plates 300, 300' co-act with hem overfolding elements 441 and 460 to form the first folds on the opposite raw edges of the blank.

Of course, while the web material W is clamped against the upper surfaces of the outermost carrier belts 700, 700' in the first group, and before the first folding means 441, 460 operate to form the first folds in the opposite raw edges of the blank, the blank is severed from the web material by means of one of the reaches or runs of an endless cutting blade 380 of a web cutting mechanism broadly designated at 194. As described in said co-pending application, the inner reach of the cutting blade 380 of the web cutting mechanism 194 is continuously driven and moves upwardly at an angle to sever the web material W progressively from one selvage edge to the other thereof.

Upon the first overlying fold being formed at each opposite end edge of the blank B severed from the web material W, the endless carrier belts 700, 701, 702, 700', 701' and 702' are automatically driven to cause the blank B thereon to move forwardly in a direction transversely to the longitudinal axis of the web material W, the latter driving means also being effective at this time to impart forward movement to the upper runs of carrier belts 705 to 707 and 705' to 707' which form a second or front group of carrier belts whose rear portions are disposed in overlapping side by side relation to the front portions of the respective rear carrier belts 700 to 702 and 700' to 702'. As each successive blank B is advanced by the rear carrier belts 700 to 702 and 700' to 702' onto the rear portions of the top runs of the corresponding front carrier belts 705 to 707 and 705' to 707' they pass beneath improved pressure applying belts which form parts of the present invention and will be later described in detail.

The outermost of the front carrier belts 705, 705' are so spaced that the outer portions or folded edges of the hems of the blank are positioned upon the belts 705, 705' and, as the blank is advanced by the front carrier belts 705, 705', the inner edges of the hems are underfolded by respective underfolding or double hem folding mechanisms, broadly designated at 510 and 511 in Figures 2 and 2-A, which turn or fold the raw edge of the hem inwardly between the blank body and the hem. The hem underfolding mechanisms 510, 511 may be identical to those shown in said co-pending application.

As the leading edge of each successive blank approaches the front ends of the underfolding mechanisms 510, 511, the rear carrier belts 700 to 702 and 700' to 702' stop therewith and the front carrier belts 705 to 707 and 705' to 707' are then caused to move at a slower rate of speed, substantially simultaneously with which respective sewing machines, generally designated at 540 and 540', are actuated to start the stitching of the respective hems. As the leading edge of the blank approaches the sewing machines 540, 540', a portion of the blank inwardly of each of the outermost front carrier belts moves onto the upper reach or top run of an outer discharge carrier belt 366 and portions of the blank adjacent the center thereof move onto the upper reaches or top runs of inner discharge carrier belts 366', the rear portions of the inner discharge carrier belts 366' being disposed in overlapping side by side relation to the front portions of the respective front carrier belts 707, 707', and the rear portions of the belts 366 being disposed substantially midway between the overlapping front ends of the respective pairs of front carrier belts 705, 706 and 705', 706' as is clearly shown in Figures 2, 2-A and 3. The sewing machines 540, 540' may be of the usual commercial type having either vertical or slanting needles N thereon which reciprocate longitudinally of their respective axes or, in other words, substantially vertically, when the sewing machines are driven.

Now, the improvement generally resides in hem or outer endless pressure applying belts 720 and 720' and intermediate or blank body pressure applying belts 721 and 721' which are disposed above, and extend in parallel relation to, the respective front carrier belts 705, 705' and 706, 706', and are driven, by means to be later described, at the same rate of speed as the front carrier belts 705, 706, 707, 705', 706', 707'. Also, the improvement includes belt tensioning and retracting devices broadly designated at 722 and 722' which are disposed adjacent the needles N of the respective sewing machines 540, 540' and facilitate moving the forward portions of the outer endless pressure applying belts 720, 720' upwardly and rearwardly away from the respective sewing machines 540, 540', as desired, for repairing the sewing machines or replacing the needles thereof.

The improvement also includes improved needle stripping and guiding devices broadly designated at 725, 725' disposed one adjacent each of the sewing machines 540, 540' for stripping the hem from each of the needles N in the course of upward movement thereof and which is provided in lieu of the usual presser feet. Also, improved blank tensioning, retarding or hem alining means, broadly designated at 726 and 726', are preferably disposed slightly inwardly and rearwardly of the needles N of the respective sewing machines 540, 540'. Essentially, the retarding means are disposed adjacent the needles and operate automatically, in a manner to be later described, for clamping the blank adjacent the inner underfolded edge of each hem against the bases of the sewing machines 540, 540' to retard movement of the blank, since the reciprocation of the needles N tends to retard forward movement of the overfolded portions of the hems of the blank relative to the body of the blank due to the uninterrupted forward movement of the blank, since heretofore, wherein the usual feed dogs were employed, the feed dogs have advanced the body of the blank intermittently and such retarding means as that indicated at 726 and 726' has not been necessary. A detailed description of the construction of the improved hem alining mechanisms, including the pressure applying belts 720, 721, 720', 721', the belt tensioning and retracting devices 722, 722', the needle stripper devices 725, 725' and the blank retarding or tensioning devices 726, 726' will be later described in detail.

*Detailed description of machine*

Since the means for paying out the web material 150, the means for drawing successive portions of the web material across and above the rear endless carrier belts 700 to 702 and 700' to 702', the hold-down plates 300, 300', the first folding plates or devices 441 and 460, the means for severing each successive blank from the web material and the electrical control circuit for the lattter means are clearly shown in said co-pending application, a detailed illustration and description of the same in the present application is deemed unnecessary. The electrical control circuit for the means for forming each successive blank with partially folded hems on opposite end or raw edges thereof is generally designated at 730 in Figure 12, the control circuit 730 of Figure 12 preferably including all of that part of the electrical circuit shown in Figure 23-A of said co-pending application.

The frame of the machine, broadly designated at 10, supports a pair of transversely spaced web or blank supporting platforms or tables 75, 76 which extend from the rear of the machine to the front of the machine and define an elongated slot or opening 77 therebetween. The top runs or reaches of the intermediate rear and front carrier belts 701, 702, 706, 707 are supported by, and move in sliding engagement with, the upper surface of the platform 75 and the top runs or upper reaches of the intermediate rear and front carrier belts 701', 702' and 706', 707' are supported by, and move in sliding engagement with, the upper surface of the platform 76. Thus, the platforms 75, 76 support the portions of each successive blank disposed between adjacent carrier belts to prevent the same from sagging.

The slot 77 defined between the promixal edges of the platforms 75, 76 is provided to accommodate a transverse slack formed in the central portion of each successive blank prior to the blank being severed from the web W by means of a measuring and slack-forming bar 283 beneath which the web W is drawn by the grippers 250 and which is caused to move downwardly into the slot 77, by means not shown in the present drawings, but being clearly shown in said co-pending application, in order to form a transverse slack in the web material prior to the blank being severed therefrom and to thereby insure that the blank is of a predetermined length.

The rear portions of the rear carrier belts 700 to 702, 700' to 702' are mounted on corresponding pulleys 327, 331, 327' and 331' fixed on transverse shafts 332 and 332' suitably journaled in the frame 10. The upper reaches or top runs of the rear carrier belts 700 to 702 and 700' to 702' are preferably of only slightly greater length than the width of the web material W and the front portions of the rear carrier belts 700 to 702 are mounted on pulleys 703, the front portions of the other rear carrier belts 700' to 702' being mounted on pulleys 703' (Figures 1, 2–B, 2–C and 3).

The pulleys 703, 103' are fixed on respective transverse shafts 704, 704' journaled in the frame 10 of the machine. The rear portions of the front carrier belts 705 to 707 and 705' to 707' are disposed in overlapping side by side relation to, and adjacent the front portions of, the respective rear carrier belts 700 to 702 and 700' to 702'. The rear portions of the front carrier belts 705 to 707 are mounted on corresponding pulleys or wheels 710 and the rear portions of the other front carrier belts 705' to 707' are mounted on corresponding wheels or pulleys 710'. The pulleys 710, 710' are fixed on respective transverse shafts 711, 711' suitably journaled in the frame 10.

The front portions of the intermediate front carrier belts 706, 707 are mounted on respective pulleys 345 and the front portions of the intermediate carrier belts 706', 707' are mounted on respective pulleys 345'. The front portions of the outer carrier belts 705, 705' are mounted on respective pulleys 346, 346'. The pulleys 345, 346 are fixed on a common transverse shaft 350 and the pulleys 345', 346' are fixed on a corresponding transverse shaft 350'.

It will be observed in Figure 1 that the rear portions of the platforms 75, 76 have openings 330 therethrough through which the rear portions of the rear carrier belts 701, 702, 701', 702' pass as they engage the corresponding pulleys. The central portions of the platforms 75, 76 are provided with openings 708 (Figure 1) through which the proximal portions of the rear and front intermediate carrier belts 701, 702, 701' and 702' pass as they engage the corresponding pulleys 703, 710, 703' and 710'. The front end portions of the platforms 75, 76 are provided with respective openings 344, 347 through which the front portions of the respective carrier belts 706, 707 and 706', 707' pass as they engage the corresponding pulleys 345, 345'.

The transverse shaft 350 is journaled in bearing blocks 351 suitably secured to frame members 85, 86 and 87 (Figure 2–A), which are parts of the frame 10, whose rear ends are fixed to a transverse frame member 65 and whose front ends are fixed to a transverse frame member 96. Opposite ends of the transverse shaft 350 are connected to shafts 352, 353 by means of suitable respective overriding clutch mechanisms 354, 355.

Any suitable overriding clutch mechanism may be employed, similar to that shown in the patent to McKeown, No. 2,509,443, dated May 30, 1950, and, therefore, a detailed illustration and description thereof is deemed unnecessary. It might be stated, however, that the overriding clutch mechanisms 354, 355 are provided so the shaft 350 may be driven either by the shaft 352 or the shaft 353, whichever of the shafts 352 or 353 rotates at the fastest speed.

The shaft 353 is relatively short and is journaled in a bearing block 356 suitably secured to a frame member 88 which extends in spaced parallel relationship to the frame member 87 and is connected at opposite ends thereof to the frame members 65, 96. Pulleys 345', 346' are fixed on the common transverse shaft 350', which is disposed in spaced substantial axial alinement with the shaft 350. The shaft 350' is journaled in bearing blocks 351' suitably secured to frame members 93, 94. Opposite ends of shaft 350' are connected to stub shafts 352', 353', by means of overriding clutch mechanisms 354', 355' which function in the same manner as the clutch mechanisms 354, 355, heretofore described.

The shaft 353' is journaled in a bearing block 356' suitably secured to a frame member 92 spaced inwardly from and extending parallel to the frame member 93. The rear ends of the frame members 92, 93, 94 are fixed to the transverse frame member 65 and the front ends of the frame members 92, 93, 94 are fixed to a common transverse frame member 97.

The distal ends of the shafts 352, 352' project from respective gear reduction units 360, 360' suitably secured to the upper surfaces of respective frame members 84, 95, whose rear ends are also suitably secured adjacent opposite ends of the transverse frame member 65 and whose front ends are suitably secured to the distal ends of the respective frame members 96, 97. The frame members 84 through 88 and 92 through 95 are disposed on substantially the same level and it will be observed in Figure 5 that the frame members 84 through 87 are spaced substantially below the level of the platform 75.

The proximal ends of shafts 353, 353' have respective sprocket wheels 361, 361' fixed thereon which are engaged by respective sprocket chains 362 which extend downwardly as shown in Figures 3, 4 and 5 and engage respective sprocket wheels 363, 363'. The sprocket wheels 363, 363' are driven by respective electric gear reduction motors 364, 364', which should be provided with inherent self-braking means to preclude the necessity of providing other braking means to accurately control the position of the blank B during the course of each successive series of operations. The self-braking motors may be of a type manufactured by The Leland Electric Company, 11 West Monument Building, Dayton 1, Ohio, and which are termed as "Master Uni-Brake" motors, as described in Sweet's File for Product Designers, Section 3a/10, page 6, in the 1946 issue thereof.

It will be noted in Figure 3 that the sprocket chains 362, 362' extend beneath and partially around the respective sprocket wheels 363, 363' and then extend rearwardly and substantially half-around respective sprocket wheels 713, 713' fixed on the proximal ends of the respective shafts 704, 704' heretofore described (Figure 3).

It will be observed in Figures 2, 2–A and 3 that the rear portion of one of the discharge endless carrier belts 366 is disposed between the front or foremost portions of each of the pairs of adjacent front carrier belts 705, 706 and 705', 706' and the rear portion of one of the discharge carrier belts 366' is disposed adjacent the foremost portion of each of the innermost carrier belts 707, 707'. The front portions of the discharge carrier belts 366, 366' are disposed forwardly of the front portions of the front main carrier belts 705 to 707 and 705' to 707' in order to carry the blank off of the front ends of the platforms 75, 76. Of course, the front main carrier belts 705 to 707 and 705' to 707' may extend forwardly to the point at which the foremost portions of the discharge carrier belts 366, 366' are disposed, if desired. In this event, the discharge carrier belts 366, 366' could be omitted.

Each of the discharge carrier belts 366 is mounted on a pair of pulleys or wheels 367, 368 and each of the discharge carrier belts 366' is mounted on a pair of pulleys or wheels 367', 368'. The pulleys, 367, 367' are fixed on respective shafts 370, 370' journaled in respective bearing blocks 371, 371'. The bearing blocks 371 are fixed on the frame members 85, 86, 87, 88 and the bearing blocks 371' are fixed on frame members 92, 93, 94. The pulleys 368, 368' are fixed on respective shafts 372, 372' journaled in respective bearing blocks 373, 373'. The bearing blocks 373 are fixed on the frame members 86, 87, 88 and the bearing blocks 373' are fixed on the frame members 92, 93.

The shafts 352, 352', extending from the respective gear reduction units or gear boxes 360, 360', have respective sprocket wheels 374, 374' fixed thereon which are engaged by respective sprocket chains 375, 375' which also engage respective sprocket wheels 376, 376' fixed on distal ends of the shafts 370, 370'. Thus, the discharge carrier belts 366, 366' are driven at the same speed as the adjacent front main carrier belts 705 to 707 and 705' to 707'. The electric gear reduction motors 364, 364' (Figures 2, 2-A, 3, 4 and 12) may be termed as high speed motors, since the gear reduction units 360, 360', when driven by the slow speed motors 580, 580', are instrumental in moving the belts 705 to 707 and 705' to 707' at a relatively slow speed as the blank passes through the sewing mechanism 540, 540', as will be later described.

Hem overfolding mechanisms

As heretofore stated, the inner or raw edges of the hems are underfolded as the blank B is advanced by the front carrier belts 705, 705' by means of respective underfolding or double hem mechanisms 510 and 511 which are disposed immediately adjacent and inwardly of the top runs of the outer front carrier belts 705, 705'. The underfolding mechanism 511 is shown in detail in Figures 13 through 18, this being the underfolding mechanism disposed at the right-hand side of the machine in Figure 2-A and as shown in Figures 4 and 6. The folding mechanism 510 at the left-hand side of the machine in Figure 2 is identical to the folding mechanism 511 except being opposite hand. Therefore, only the folding mechanism 511 will be described in detail and those parts of the folding mechanism 510 shown in the drawings shall bear the same reference characters.

As the front edge of each successive blank B moves forwardly beyond the hold-down plates 300, 300', and the hem-overfolding elements 441, 460, the hems B-1 at opposite side edges thereof (only one of which is shown in Figure 13) ride onto respective folder or hem guide plates 480, 480', portions of which are shown in Figures 2-A and 2, respectively. A front end portion of the folder guide plate or hem guide plate 480 is also shown in Figure 15. The purpose of the folder guide plates 480, 480' and the manner in which they are constructed and supported are clearly set forth in said copending application and a detailed illustration and description thereof is deemed unnecessary. However, it will be observed in Figures 6, 13, 14 and 15 that the front end of the hem guide plate 480 terminates a substantial distance rearwardly of the forward end of the frame member 483 and immediately adjacent the rear end of the corresponding underfolding mechanism 511. The hem guide plate 480' is also arranged in the same manner as the plate 480 with respect to the corresponding underfolding mechanism 510. However, only the underfolding mechanism 511 will be described in detail, as heretofore stated.

It will be observed in Figure 6 that the forward portion of the frame member 483 has a bar or auxiliary frame member 512 suitably secured to the lower surface thereto and held in spaced relation thereto by suitable spacing members 513. The underfolding mechanism 511 is supported in spaced relation below the bar 512 by a pair of threaded rods 514, 515. The lower end of the bolt or threaded rod 514 (Figures 13, 14 and 15) supports the rear portions of a top hem guide plate 520, a hem-folder plate 521 and a hem-turning plate 522, the latter serving as a spacer between the plates 520, 521 at the rear portions thereof.

It will be noted in Figure 14 that the upper surface of the hem guide bar or plate 480 terminates substantially on the same level as the upper surface of the top hem guide plate 520 and terminates in closely spaced relation thereto.

In order to guide the corresponding hem B-1 downwardly between the top hem guide plate 520 and the hem-folder plate 521, the rear edge portion of the top hem guide plate 520 is cut away and bent upwardly, as at 523, and has a lead-in plate 524 suitably secured thereto which extends rearwardly and upwardly at an angle above the hem guide plate 480. Thus, the lead-in plate 524 leads the hem B-1 downwardly from atop the hem guide plate 480 and between the plates 520, 521, as shown in Figure 16. As the blank B advances forwardly, the raw inner edge of the hem B-1 passes over an opening 525 in the hem-folder plate 520 (Figure 15). The hem-folder plate 521 also has an elongated slot or passageway 526 communicating with the opening 525 and extending forwardly therefrom.

The hem-turning plate 522 has a down-turned flange portion 527 integral therewith which, at the rear end thereof, is of zero thickness or vertical height and gradually tapers downwardly and forwardly at the lower edge thereof and extends through the slot or passageway 526. Thus, as the hem B-1 moves forwardly, the raw edge thereof passes beneath the portion of the hem-folder plate 521 which extends over the opening 525 and is then directed downwardly by the down-turned flange 527 and thus depends through the opening or slot 526 as best shown in Figure 17.

In order to insure that the body portion of the flange B is spaced from the lower surface of the hem-folder plate 521 sufficiently to permit the raw edge of the hem B-1 to depend from the plate 521 through the passageway or slot 526, a hem spreading element or plate 530 is provided which, as shown in Figure 14, is provided with a downwardly and rearwardly curving lower rear edge which is disposed immediately forwardly of the opening 525 and engages the main body portion of the blank, causing the same to move downwardly away from the corresponding hem B-1 as is clearly shown in Figures 17 and 18.

After the rear raw edge of the hem B-1 has been turned downwardly through the passageway or slot 526 by the flange 527 of the hem-turning plate 522, the portion of the raw edge of the hem B-1 extending through the passageway 526 engages a forwardly and outwardly inclined or beveled edge 532 of a bottom hem guide plate 533. The hem guide plate 533 is suitably secured to the lower surface of a spacing bar 534 which is flush with the inner edge of the bottom hem guide plate 533 and is of substantially less width than the plate 533. As a matter of fact, the outer edge of the spacing bar 534 terminates at the corresponding inner wall of the passageway or slot 526 as best shown in Figure 18. The plate 534 is suitably secured to the hem-folder plate 521. The bolt or threaded rod 515 serves to support the front portions of all the plates 520, 521, 522, 533 and 534 (Figure 18).

It will be noted that the slot or passageway 526 in the hem-folder 521 forms a relatively narrow hem shaping portion 521a on the plate 521 about which an underfold B-3 is formed on the hem B-1 (Figure 18). This underfold B-3 is ultimately formed as the depending raw edge of the hem B-1 shown in Figure 17 moves forwardly and engages the beveled edge 532 of the bottom hem guide plate 533 to thus be folded inwardly as shown in Figure 18. It will be noted that the portion 521a of the plate 521 extends forwardly beyond the front edges of all the other plates of the folding mechanism 511 and beneath the needle stripper 725 to thereby maintain the underfold B-3 in substantially the position shown in Figure 18 relative to the hem B-1 per se as the body of the blank B is moved upwardly against the underfold B-3 by an upwardly and forwardly inclined blank elevating plate 535 (Figures 4, 6 and 14). The front portions of the plates 535 are suitably secured to the corresponding transverse frame members 80, 81 (Figures 2, 2-A, 6, 8, 9 and 15).

Stitching devices and control means therefor

As set forth in said co-pending application, each successive blank is advanced toward the sewing mechanisms or sewing machines 540, 540' successively by the rear and front groups of carrier belts, and, as the blank is advanced by the front group of carrier belts, a hem B-1 is formed at each raw edge or severed edge of the blank by means of the underfolding devices 510 and 511 and the front ends of the underfolding mechanisms 510 and 511 terminate closely adjacent and rearwardly of the respective sewing machines 540, 540', as the underfolding mechanism 511 is shown in Figures 7, 8, 9 and 10. The sewing machines 540, 540' are conventional with the exception of slight modifications to be later described and are preferably of the type shown in Singer Catalogue Form 29664 (148) or known as Model No. 400W21. Therefore, only so much of the sewing machines 540, 540' will be described as is necessary to a clear understanding of the present invention. Of course, right-hand and left-hand sewing machines are used.

The sewing machines 540, 540' are provided with respective base plates 542, 542' fixed on respective substantially rectangularly-shaped sewing machine support brackets 125, 126 fixed to and extending forwardly from respective transverse frame members 80, 81 which are parts of the frame 10, a detailed description of the frame 10 being deemed unnecessary since the frame 10 may be constructed in substantially the same manner as the frame of the machine shown in said co-pending application.

The sewing machines 540, 540' are conventional in all respects, with the exception that the usual feed dogs and presser feet are omitted therefrom and, instead, each of the base plate 542, 542' is provided with a groove 543 in the upper surface thereof (Figure 5). The upper reaches of the outermost front carrier belts 705, 705' have sliding movement in the corresponding grooves 543, the grooves 543 being provided to insure that the opposite edge portions of the blank B will lie upon and slide in engagement with the upper surfaces of the sewing machine base plates 542, 542', as shown in Figure 5, during the hem stitching operations. Thus, the speed at which each successive blank B passes through the sewing machines is determined entirely by the speed of the front carrier belts, thereby providing means whereby the speed of the blank B through the sewing machines 540, 540' may be regulated independently of the speed of the sewing machines 540, 540' and also facilitating the formation of stitches by the needles N of varying lengths, as desired.

The sewing machines 540, 540' are controlled automatically to start operating when the folded hems B–1 of each successive blank B are about to be engaged by the needles N of the sewing machines 540, 540', and to stop the sewing machines immediately after each successive blank is completed as a bed sheet or the like. Also, as the leading ends of the hems approach the front ends of the underfolding mechanisms 510, 511, the front carrier belts at one side of the machine may stop momentarily while the front carrier belts at the other side of the machine may continue to move until the leading edges of the corresponding hems B–1 are positioned equi-distant from the needles N of the respective sewing machines 540, 540'. Also, this provides a short interval of time during which the sewing machines 540, 540', which are normally idle, are started and while an electrically controlled shifting mechanism operates to subsequently cause the front carrier belts to move at a relatively slower speed than they had been moving while advancing the blank toward the sewing machines so that the blank subsequently moves through the sewing machines 540, 540' at a relatively slower speed. Also, as the hems B–1 are being stitched by the sewing machines 540, 540', the rear carrier belts 700 to 702 and 700' to 702' remain stationary so that a succeeding blank may be formed thereabove while the preceding blank is being stitched.

Referring to Figures 2, 2–A and 12, it will be observed that, as the front edge of each successive blank B approaches the front ends of the underfolding mechanisms 510, 511, said front edge engages and raises a pair of switch operating feeler fingers 544, 544' which depend from and are pivotally connected to respective normally closed stop switches 545, 545'. These switches are of the type which open upon upward movement of the fingers 544, 544' and remain open until the blank moves therebeyond.

Switches 545, 545' are carried by respective brackets 547, 547' suitably secured to a transverse frame member 70 of the frame 10 spaced above the plates or platforms 75, 76. The brackets 547, 547' also support respective normally open stop switches 550, 550' provided with pivoted switch operating feeler fingers 551, 551' which are adapted to be engaged by the leading edge of each successive blank B and moved upwardly thereby. The switches 550, 550' operate opposite to the switches 545, 545' in that they close and subsequently open as the fingers 551, 551' move downwardly and as the trailing edge of the blank moves therebeyond, all of which is clearly disclosed in said copending application.

After the web feeding mechanism 205 has moved to the retracted position, as shown in Figure 1, and the first fold has been completed, the high speed electric motors 364 and 364' (Figures 2, 2–A, 3 and 4) are energized to cause both the rear and front groups of carrier belts to advance the blank B through the machine at a relatively high speed until the front or leading edge of the blank engages the switch operating feeler fingers 544, 544'. To this end, it will be observed in Figures 2–A and 2–C that the machine is provided with a continuously driven cam shaft 208 which has a cam wheel 560 fixed thereon whose high point is adapted to engage a switch actuating arm 561 (Figure 12) of a normally open momentary contact start switch 562. The switch 562 is suitably secured to a vertically disposed plate 563 depending from a longitudinally extending side frame member 11 of the frame 10 (Figure 2–C).

It will be observed in Figures 2–A and 2–C that the cam shaft 208 extends forwardly and rearwardly and is disposed inwardly of and below the level of the side frame member 11. The cam shaft 208 is suitably journaled on the frame 10 and the rear end of the cam shaft 208 is coupled to a transverse shaft 425 by means of bevel gears 423, 424 (Figure 2–C). The transverse shaft 425 is suitably journaled on the frame 10 and its end opposite from the cam shaft 208 has a sprocket wheel 431 (Figure 2–B) fixed thereon which is engaged by a sprocket chain 432 which also engages a sprocket wheel 433 (Figure 2–B). The sprocket wheel 433 is driven by an electric motor 434 which is instrumental in driving the web feeding mechanism 205, operating the grippers 250, the first fold devices 441, 460 and the blank measuring and slack forming device or bar 283 in addition to imparting continuous rotation to the cam shaft 208, all of which is clearly shown in said co-pending application and a further description thereof thus being deemed unnecessary.

Referring now to Figure 12, it will be observed that the switch 562 has wires 562a, 562b extending therefrom to a magnetic relay 564 which, in turn, has wires 564a, 564b extending therefrom to respective lead wires 182, 183. The lead wires 182, 183 are connected to opposite sides of a suitable plug 441 adapted to be connected to a suitable source of electrical energy, not shown, and the wire 182 has a suitable manually operable master switch 437 interposed therein.

The magnetic relay 564 is one of four substantially identical magnetic relays, the other three of which are indicated at 565, 566 and 567 in Figure 12. All of the magnetic relays 564 to 567 may be identical and of a type such as is manufactured by Allen-Bradley Company and which is shown in Sweet's File for Product Designers, Section 3b/1, page 80, and which is termed as a Form 2, Bulletin 709 solenoid across-the-line switch. Since there are many other types of conventional magnetic or solenoid relays which may serve as the relays 564 to 567, inclusive, no attempt will be made herein to describe these relays in detail and only the function thereof will be described.

As a matter of fact, the major portion of the circuit shown in Figure 12 is identical to the circuit shown in Figure 23 of said co-pending application, but a detailed description thereof is deemed necessary in order to clearly understand the operation of the present invention.

Wires 562c, 562d are connected at corresponding ends to the respective wires 562a, 562b, the other ends of these wires being connected to the magnetic relay 565. The magnetic relay 565 has wires 565a, 565b extending therefrom to the respective lead wires 182, 183. Upon switch 562 being momentarily closed, by cam 560 engaging and moving the switch actuating arm 561, a circuit is completed to each of the high speed electric motors 364, 364', since the magnetic relays 564, 565 are energized, causing current to flow through respective pairs of wires 570, 570a and 571, 571a which extend from the respective magnetic relays 564, 565 to opposite sides of the respective motors 364, 364'.

The magnetic relays 564 to 567, inclusive, are each of the type which remains closed upon the corresponding start switch being momentarily closed and then opened and until the corresponding stop switch is closed and then opened, because the operating coil, not shown, of each of the magnetic relays 564 through 567 is continuously energized through a conventional hold-in contact, until the corresponding stop switch is closed and then opened, as is well known to those familiar with solenoid across-the-line switches.

Now, the stop switches 545, 545' have respective pairs of wires 572, 572a and 573, 573a connected to opposite sides thereof which extend therefrom to the respective magnetic relays 565 and 564. The normally closed stop switches 545, 545', upon being opened through engagement of the leading edge of each successive blank B with the feeler fingers 544, 544', de-energize the magnetic relays 564, 565, thereby breaking the circuit to the respective motors 364' and 364 to thus stop the rear and front carrier belts.

It is to be noted that the stop switches 545, 545' control the stopping of the electric motors 364, 364' independently. This insures that the carrier belts at one half of the machine are driven independently of the carrier belts at the other half of the machine in the event the leading edge of the blank becomes skewed and engages first one of the switches 545 or 545' and then the other. In this event, one of the switches 545, 545' will stop one of the electric motors 364, 364' and then the other of the electric motors will stop thereby insuring that the leading ends of the hems B-1 are positioned in alinement with each other or a uniform distance rearwardly of the needles N of the sewing machines 540 and 540'.

Now, in order to drive the sewing machines and to impart relatively slow movement to the front carrier belts 705 to 707 and 705' to 707' while the rear carrier belts 700 to 702 and 700' to 702' remain stationary, sewing machine motors 580, 580', which may also be termed as slow speed motors for the front carrier belts, are supported on the frame 10 beneath the respective sewing machines 540, 540'. The shafts of the respective motors 580, 580' have respective pairs of pulleys 605, 606 and 605', 606' mounted thereon, the pulleys 606, 606' preferably being of the variable-pitch or expanding type.

The pulleys 605, 606, 605' and 606' are engaged by respective belts 610, 611, 610' and 611'. The belts 610, 610' are also mounted on respective pulleys 612, 612' for driving the respective sewing machines 540, 540'. The belts 611, 611' are preferably V-belts and are mounted on variable-pitch or expanding pulleys 613, 613' which are mounted on the outer ends of respective stub shafts 614, 614' extending from the respective gear reducing units 360, 360' to thus drive the respective shafts 352, 352'. The expanding pulleys 606, 613, 606' and 613' may be of any desired or conventional construction, such as the pulley shown in the patent to D. J. Abbot, No. 1,662,654 of March 14, 1928, and, therefore, a detailed description thereof is deemed unnecessary.

At the proper time, after the leading edge of a blank has moved forwardly of the switch operating fingers 544, 544' to open the switches 545, 545', a cam 581 fixed on the cam shaft 208 engages a switch actuating arm 582 to momentarily close the momentary contact start switch 583 (Figures 2–C and 12). The switch 583 is suitably secured to plate 563 and has a pair of wires 583a, 583b extending therefrom to the magnetic relay 566, which relay has wires 566a, 566b extending therefrom to the respective lead wires 182, 183.

Corresponding ends of wires 583c, 583d are connected to the respective wires 583a, 583b, the other ends of the wires 583c, 583d being connected to the magnetic relay 567. The magnetic relay 567 also has wires 567a, 567b extending therefrom and connected to the respective lead wires 182, 183. The relays 566, 567 have respective pairs of wires 584, 584a and 585, 585a extending therefrom to opposite sides of the respective sewing machine or slow speed motors 580, 580'.

It will also be observed in Figure 12 that the magnetic relays 567, 566 have respective pairs of wires 600, 600a and 601, 601a extending therefrom whose other ends are connected to opposite sides of the respective stop switches 550, 550'. It is thus seen that, as the start switch 583 is closed by the cam 581, this energizes the slow speed or sewing machine motors 580, 580' and, due to the overriding clutch mechanisms 355, 355', the shafts 350, 350' (Figures 2, 2–A, 3 and 12) will then be driven independently of the shafts 704, 704'.

This results in the front carrier belts 705 to 707 and 705' to 707' moving at a relatively slow rate of speed while the rear carrier belts 700 to 702 and 700' to 702' remain stationary. Thus, the various cams for actuating the web feeding mechanism 205 and the cutting and folding means, as described in said co-pending application, may be so timed as to operate their corresponding mechanisms while the front carrier belts 705 to 707 and 705' to 707' are advancing a corresponding blank through the underfolding mechanisms 510 and 511 (Figures 2 and 2–A) and the sewing machines 540 and 540' at a slow speed.

Of course, as the trailing edge of each successive blank moves past and beyond the fingers 551, 551' (Figure 12), the fingers 551, 551' move downwardly to de-energize the electric motors 580, 580' and stop further movement of the front carrier belts 705 to 707 and 705' to 707', inclusive. Thereafter, the cam 560 (Figures 2–C and 12) would be so positioned on cam shaft 208 as to momentarily close the start switch 562 to again start the electric motors 364, 364' to effect another cycle in the operation of the machine.

*Detailed description of improved hem control means*

The parts of the machine heretofore described, with the exception of the improved hem guiding and controlling means at each side of the machine, are substantially the same as described in said co-pending application and the improved hem guiding and controlling means will now be described in detail.

It quite often happens that "ears" are formed on opposite ends of the hems of bed sheets, blankets or other articles produced on the machine disclosed in said co-pending application, due to the fact that the slackened central portion of each successive blank tends to bow the blank rearwardly and, since the blank moves continuously as it is fed through the sewing machines, rather than being fed intermittently in timed relation to the vertical reciprocation of the sewing needles of the sewing machines, as would be the case if the usual type of feed dogs were employed, the folded side edges of the blank; that is, the overfolded and underfolded portions of the hems, are restrained from forward movement as compared to the forward movement of the body of the blank because the needles N penetrate the overfolded and underfolded portions of the hems for a longer period of time in the course of each reciprocation of the needles than the period of time during which they penetrate the body of the blank. This is apparent, since each needle passes successively through the overfolded portion and then the underfolded portion of each hem and then through the body of the blank and, as the needle is withdrawn, it is evident that it is successively withdrawn from the body of the blank, through the underfolded portion and then the overfolded portion of the hem.

Another condition which has contributed to cause misalignment of the opposite ends of the hems relative to the leading and trailing edges of the blank is the fact that the pressure applying belts disposed above the outermost front carrier belts have been driven solely through frictional contact with the portions of the blank passing between the proximal reaches or runs of the outer carrier belts and the corresponding pressure applying belts.

In order to overcome the above and other defects, two pressure applying belts 720 and 721 are provided at one side of the machine and two corresponding pressure applying belts 720' and 721' are provided at the other side of the machine. These pressure applying belts are disposed above and in alinement with the respective front carrier belts 705, 706 and 705', 706'. These pressure applying belts 720, 721, 720', 721' are independently driven at the same surface speed as that of the corresponding carrier belts and, of course, the outer surfaces of all of the carrier belts and the pressure applying belts are preferably provided with complementary longitudinally extending grooves and ridges to prevent the blanks from moving laterally of the carrier belts and the pressure applying belts.

Since the parts associated with the pressure applying belts at both sides of the machine are identical, except some of the parts being opposite hand, the same reference characters shall apply to the parts at both sides of the machine and those at the left-hand side of the machine in Figures 1, 2 and 2–B shall bear the same reference characters as those parts at the right-hand side of the machine shown in Figures 1, 2–A and 2–C, with the prime notation added and only the parts at the right-hand side of the machine will be described in detail.

The front portion of the inner pressure applying belt 721 terminates short of the foremost portion of the corresponding intermediate front carrier belt 706 and passes substantially half around a pulley or wheel 731 (Figures 2–A, 4 and 5) rotatably mounted on a stub shaft 732 fixed in the front end of a longitudinally extending frame member 733. The front portion of the frame member 733 is suitably secured to the lower end of a bracket 734 depending from the transverse frame member 70 and the rear end of the frame member 733 is suitably secured to a bracket 735 depending from a transverse frame member 36 spaced above the platforms 75, 76, adjacent the vertical plane of the junctures of the rear and front carrier belts 700 to 702, 700' to 702' and 705 to 707, 705' to 707'. The frame member 36 is a part of the frame 10 as clearly described in said co-pending application.

The rearmost portions of both the inner and the outer pressure applying belts 720, 721 preferably terminate slightly forwardly of the rearmost portions of the corresponding front carrier belts 705, 706 and are mounted on respective grooved pulleys or wheels 736, 737 (Figure 2–C) rotatably mounted on respective stub shafts 740, 741 (Figure 2–C). The stub shaft 741 is fixed in the longitudinally extending frame member 733 and the stub shaft 740 is fixed to the horizontal leg of a substantially L-shaped bracket 742 whose vertical leg is suitably secured to the transverse frame member 36 disposed above the level of the pressure applying belts 720, 721.

The foremost or front portion of the outer endless pressure applying belt 720 also terminates short of the foremost end of the corresponding front carrier belt 705 and, preferably, in substantially the same lateral plane as the needle N of the sewing machine 540. The front portion of the outer endless pressure applying belt 720 is mounted on a pulley or wheel 744 which, necessarily, normally overlies the base 542 of the sewing machine and which is, therefore, supported on an angularly disposed bar 745 having a toothed rack 746 formed integral therewith and which is a part of the improved pressure applying belt retracting and tensioning or positioning device 722.

The pulley 744 is rotatably mounted on a stub shaft 748 (Figures 5 and 10), one end of which is fixed to the lower front end of the rack bar or guide bar 745. The guide bar 745 extends upwardly and rearwardly at an angle and is mounted for longitudinal sliding movement in a guide block 747 suitably secured to and depending from the transverse frame member 70. The pulley 744 is best shown in operating position in Figure 8 and in inoperative or retracted position in Figure 9. In order to regulate the position of the pulley 744, the rack 746 is engaged by a pinion or gear 750 fixed on one end of a shaft 751 journaled in a bearing block 752 suitably secured to, and depending from, the transverse frame member 70 (Figures 9 and 11).

The other end of the shaft 751 has one end of a crank arm 753 fixed thereon which has a suitable handle 757 projecting laterally therefrom. In order to maintain the pulley 744 in operative position when it is so positioned by the operator, the crank arm 753, which then projects downwardly substantially vertically from the bearing block 752 as shown in Figure 11, is engaged by a latch block 754 fixed on the rear end of a leaf spring member 755 (Figures 2–A, 9 and 11) whose front end is suitably secured to an inverted L-shaped bracket 756 suitably secured to, and depending from, the transverse frame member 70.

Thus, in order to retract and slacken the front portion of the endless outer pressure applying belt 720, to move the same from the position shown in Figure 8 to that shown in Figure 9, the operator merely flexes the leaf spring member 755 to move the latch 754 clear of the crank arm 753 and then rotates the crank arm 753 in a clockwise direction to the position shown in Figure 9, thereby moving the rack 746, guide bar 745 and pulley 744 upwardly and rearwardly to the position shown in Figure 2–A. It will be observed in Figure 2–A that the rear or outer surface of the latch block 754 is beveled so that, as the crank arm 753 is rotated substantially a half revolution in a counter-clockwise direction in Figure 9, the pulley 744 will be returned to the operative position shown in Figure 8 during the course of which the crank arm 753 will engage the beveled surface on the rear portion of the latch 754 and will thereby bias the same inwardly which will then snap outwardly to latch the crank arm 753 in operative position and to maintain the belt 720 under proper tension.

It will be observed in Figures 1, 2, and 2–C, inclusive, 3 and 4 that the lower surfaces of the medial portions of the upper runs or reaches of the pressure applying belts 720, 721 are engaged by respective pulleys 761, 762 fixed on a common transverse drive shaft 763 journaled in bearing blocks 764, 765. The bearing blocks 764, 765 are carried by the respective longitudinally extending frame members 733, 11 and the outer end of the drive shaft 763 has a sprocket wheel 766 fixed thereon which is engaged by a sprocket chain 767. The sprocket chain 767 extends downwardly and forwardly at an angle and is mounted on a sprocket wheel 769 fixed on one end of a jack shaft 770 suitably journaled in the frame 10 and on whose other end a sprocket wheel 771 is fixedly mounted. The sprocket wheel 771 engages the medial portion of a sprocket chain 772 mounted at opposite ends thereof on sprocket wheels 773, 774 (Figure 3). The sprocket wheels 774, 774' are fixed on the medial portions of the respective transverse shafts 350, 350' and the sprocket wheels 773, 733' are suitably mounted for rotation on the lower portion of the frame 10.

In order to insure traction between the pulleys 761, 762 and the respective endless pressure applying belts 720, 721, the upper surfaces of the upper reaches or runs of the pressure applying belts 720, 721 are engaged by respective pairs of pulleys 775, 776 and 777, 778 whose lower surfaces are disposed on a lower level than the upper surfaces of the respective pulleys 761, 762 straddled thereby, as is most clearly shown in Figure 4. The pulleys 776, 778 are fixed on a common transverse idler shaft 780 whose opposite ends are journaled in bearing blocks or stands 781, 782 carried by the respective longitudinally extending frame members 11, 733.

It will be observed in Figure 4 that the pulley 777, which may be termed as a take-up pulley, is rotatably mounted on a shoulder bolt or stud 783 mounted for vertical adjustment in a vertically slotted bracket 784 suitably secured to the upper surface of the longitudinally extending frame member 733. The pulley 775, which may also be termed a take-up pulley, is rotatably mounted on a stub shaft 785 fixed in the upper end of a crank arm 786 (Figures 1, 2-B, 2-C and 4) which extends downwardly and rearwardly and is fixed on the inner end of a pivot shaft 787 journaled in a bearing block 788 carried by the longitudinally extending frame member 11. The shaft 787 has a relatively short crank arm 790 fixed thereon which extends forwardly therefrom and is connected to the upper end of a tension spring 791. The lower end of the tension spring 791 is suitably secured to the frame 10 to thus normally urge the tension pulley 775 downwardly against the upper surface of the upper run or reach of the outer pressure applying belt 720. It might be stated that the tension pulley 775 is resiliently mounted in order to accommodate variations in the thickness of the corresponding hem passing between the belts 720 and 705 and during the formation of the underfold thereon. It is evident that the tension pulley 777 need not be resiliently pressed against the belt 721 because the sheet or blank B is of a uniform thickness throughout its travel between the belts 721 and 706.

As is the case in said co-pending application, the outer edge of the platform 75 is spaced inwardly of the vertical plane of the front carrier belt 705 and the upper reach or run of each outside carrier belt 705, 705' is supported by a plurality of rollers 337. Rollers for belt 705 are carried by, and extend inwardly from, the longitudinally extending frame member 142 (Figures 2-C, 4,6,8 and 9).

Referring to Figures 2 to 2-C, 4, 4-A and 6, it will be observed that the lower reach of each of the outer pressure applying belts 720, 720' is resiliently urged against the upper reach of the corresponding outer carrier belt, or against the hem of the sheet passing therebetween, by means of a plurality of spring pressed rollers 496. The frame 10 has a pair of longitudinally extending frame members 483, 483' spaced above the level of and inwardly of the lower runs of the respective outer pressure applying belts 720, 720'. Rollers 496 are disposed adjacent each frame member 483, 483' and mounted as best shown in Figure 4-A. The rollers 496 are mounted and resiliently biased downwardly in the same manner as disclosed in said co-pending application. Therefore, each of the pressure applying devices shall bear the same reference characters as like parts in said co-pending application.

Each of the pressure applying or spring pressed rollers 496 is carried by an arm 497 (Figure 4-A) pivoted on the corresponding longitudinally extending frame member 483 or 483', as the case may be. Only frame member 483 will be described, but like parts associated with member 483' will bear the same reference characters with the prime notation added. The rear end of member 483 is fixed to the corresponding bracket 742 (Figure 2-C) and its front end is suitably secured to the lower end of a vertically disposed frame member or support 485 whose upper end is suitably secured to the transverse frame member 70 (Figure 8). Each of the arms 497 is normally urged downwardly, as shown in Figure 4-A, by a torsion spring 500. It should be noted that the rollers 496 are disposed above the corresponding rollers 337 to urge the lower reaches of the pressure applying belts 720, 720' downwardly to clamp the hems B-1 of the blank B against the upper reaches of the outside front carrier belts 705, 705'.

As heretofore stated, the carrier belts are grooved longitudinally thereof and the pressure applying belts are also provided with longitudinally extending grooves forming projections which register with the grooves in the carrier belts to insure that the hems B-1 are maintained in parallel relation to each other as the blank B is advanced through the machine. This also serves to provide traction between the carrier belts and the pressure applying belts and, thus, a relatively narrow band of each successive blank at opposite ends thereof; that is, at each side of the machine, is maintained taut and is propelled forwardly by the front carrier belts 705, 706, 750', 706' and the lower reaches of the corresponding pressure applying belts 720, 721, 720', 721', which assists in maintaining the overfolded and underfolded portions of each hem in proper relationship so that opposite ends of each hem are properly alined with the corresponding edges of the blank body.

As each successive blank approaches the sewing machines 540, 540'; that is, after the hems are completely overfolded and underfolded on opposite edges of the blank, the blank is then advanced at a relatively slow speed, in the manner described, because the hems have to move across and in engagement with the upper surfaces of the bases 542, 542' of the respective sewing machines 540, 540'.

As heretofore stated, in lieu of the usual presser feet, the needle strippers 725, 725' are provided. Both of the strippers 725 and 725' being identical, only the needle stripper 725 will be described in detail and the corresponding parts associated with the needle stripper 725' will bear the same reference characters, where shown, with the prime notation added. It will be observed in Figures 10 and 11 that the needle stripper 725 is in the form of a plate having an enlarged rear portion 795 suitably secured to the front end of the top hem guide plate 520 of the corresponding underfolding mechanism 511 and which has an elongated narrow extension or stem portion 796 which overlies the hem-folder plate portion 521a, extends past the needle N of the sewing machine 540 and has an aperture 797 therein through which the needle reciprocates during the stitching operation. It should be noted that the stem portion 796 of the stripper 725 is disposed closely adjacent the inner underfolded edge of the corresponding hem B-1 and the inner edge of the stem portion 796 has a downwardly projecting lip portion 798 integral therewith which is adapted to engage the underfolded inner edge of the hem B-1 to assist in guiding the same during the hem stitching operation.

Now, as the leading end of each hem approaches the corresponding sewing machine 540, it is properly alined with the body portion of the blank D due to the fact that the two pressure applying belts 720, 721 are provided and both of said pressure applying belts 720, 721 are driven at the same surface speed as the complementary front carrier belts 705, 706. However, it has been found that since the needle N penetrates the overfolded and underfolded portions of the hem B-1 for a longer period of time than it does the body portion of the blank B in the course of each reciprocation of the needle N, the needle normally tends to retard movement of the overfolded and underfolded portions of the hem as compared to the body portion of the blank B which would, ordinarily, cause the trailing end of the hem to protrude beyond the trailing edge of the body portion of the blank B. In order to obviate this circumstance, the blank tensioning or retarding devices 726, 726' are provided adjacent the respective sewing machines 540, 540' and, since both of these devices are identical, only the device at the right hand side of the machine in Figure 2-A will be described in detail and the device at the left-hand side of the machine in Figure 2 will bear the same reference characters with the prime notation added.

The blank retarding device 726 comprises a blank tensioning or hold-back dog, element or finger 801 (Figures 8 and 10) whose rear end is pivoted at 802 on a bracket 803 which is shown in Figure 8 as being a strap iron member and which extends rearwardly and upwardly at an angle and then extends upwardly and is suitably secured to the transverse frame member 70. The free end of the hold-back dog 801 has a pressure applying foot or clamping foot 804 integral therewith which is in the form of a substantially cubical projection or is substantially rectangular in plan (Figure 7) and whose front and rear lower corners are preferably rounded to prevent the same from cutting or tearing the fabric, since the clamping foot 804 is adapted to engage the upper surface of the body portion of the blank immediately adjacent the underfolded inner edge of the hem B–1 and also immediately adjacent the stem portion 796 of the needle stripper 725.

When the pressure applying foot 804 is in lowered position, as shown in Figure 6, it resiliently presses the body portion of the blank B against the upper surface of the base 542 of the corresponding sewing machine 540, a leaf spring member 805 being suitably secured to the bracket 803 at one end thereof and having its other end bearing against the upper surface of the hold-back finger 801 to normally urge the pressure applying foot or clamp member 804 downwardly toward the base 542 of the sewing machine 540. A suitable spring pressure adjusting means is provided, in the form of an adjustment screw 806 which threadably penetrates the angular disposed lower portion of bracket 803 and bears against the upper medial portion of the leaf spring member 805.

The free end of the hold-back finger 801 has the lower end of an extensibly adjustable connecting rod 807 pivotally connected thereto whose other end is connected to a plunger 810 of a solenoid broadly designated at 811 (Figures 6, 8 and 12). The solenoid plunger 810 is surrounded by a coil 812 and the housing for the coil 812 and plunger 810 of the solenoid 811 is suitably secured to a bracket 813 carried by the transverse frame member 70.

Referring to Figure 12, it will be observed that corresponding ends of wires 815, 815' are connected to corresponding ends of the solenoid coils 812, 812' whose other ends are connected to opposite ends of a wire 816. The other end of wire 815 is connected to one side of a normally open switch 817 which has one end of a wire 820 connected thereto. Wires 815', 820 are connected to the respective lead wires 182, 183.

In order to elevate the foot portions or clamping members on the blank restraining devices 726, 728' during the hemstitching of a relatively short portion at the leading end of each hem B–1 on each successive blank B, a cam 821, fixed in a predetermined position on cam shaft 208, engages a switch actuating arm to close the switch 817 and energize coils 812, 812' immediately preceding the actuation of the slow speed motor start switch by the cam 581. The dwell of cam 821 is such that it will permit switch 817 to open shortly after switch 583 is actuated so the coils 812, 812' are again de-energized after some stitches have been formed in the hems B–1. This permits the foot portions, such as 804 (Figure 8), on the tensioning devices 726, 726' to swing downwardly under spring pressure, which is adjustable, and to press the body of the blank against the sewing machine bases 842, 842'. Thus, the body of the blank is restrained from being advanced by the carrier belts and pressure applying belts at a faster rate than the hems B–1.

It is apparent that cam 821 is adjustable about shaft 208 to thereby insure actuation of the retarding devices 726, 726' at any predetermined time after some stitches have been formed in the hems and, of course, the amount of pressure exerted by the foot portions 804 against the body of the blank is also predetermined by adjustment of the corresponding screws 806 which, in turn, controls the pressure of the springs 805 as heretofore described.

*Brief summary of operation*

At the initiation of each successive cycle in the operation of the present machine, it is to be assumed that the rear group of carrier belts 700—702 and 700'—702' is at rest and there is no web material or blank resting upon the top runs thereof, although the leading raw edge of the web W is clamped by the means disclosed in said co-pending application, adjacent, above the level of, and to one side of said rear group of carrier belts, substantially as shown in Figure 1. As disclosed in said copending application, means are provided to automatically impart movement to the web-feeding mechanism 205, including the grippers 250, from left to right in Figure 1 where the grippers 250 automatically clamp the raw edge of the web material and then move in an active stroke from right to left in Figure 1 back to the position shown. In so doing, the grippers draw the sheet of web material W across and above the top belt runs in the first or rear group and at the end of the active stroke of the web feeding mechanism 205, the web material is released from the grippers 250 and then rests upon the upper reaches or top runs of the carrier belts in the first or rear group.

Also, while the raw edge of the web material W is held by the grippers 250 and after the raw material has been drawn across and above the upper runs of the first group of carrier belts, the slack-forming bar 283 (Figure 1) moves downwardly from a position normally spaced above the level of the path of travel of the web-feeding mechanism 205 and engages and presses the medial portion of the web material W drawn across and above the rear carrier belts into the opening 77 defined between the plates or platforms 75, 76 to thereby insure that a given predetermined length of web materials is withdrawn from the source with each cycle in the operation of the machine.

Each time a portion of the web material W is drawn across and above the first group of carrier belts, the clamping or hold-down plates 300, 300' (Figures 1, 2–B and 2–C) move downwardly from a normally raised position to clamp the web material W against the upper runs of the outermost rear carrier belts 700, 700'. Thereupon, the driven endless cutting blade 380 (Figures 1 and 2–C) of the web-cutting mechanism 194 moves upwardly from beneath the web material and through the web material W at an angle to sever the blank B therefrom, whereupon the overfolding elements 441, 460 (Figures 2–C and 2–B, respectively) form first overlying folds at each opposite end edge of the blank B, as clearly disclosed in Figure 14 of said copending application.

Upon said first overlying folds being formed, the endless carrier belts 700—702 and 700'—702' are automatically driven, at a relatively fast speed, to cause the blank B thereon to move forwardly transversely to the longitudinal axis of the web material W, the latter driving means also being effective at this time to impart forward movement to the upper runs of the second group of carrier belts 705—707 and 705'—707' (Figures 1 to 3, inclusive, in particular). The hold-down plates 300, 300' remain in lowered position to press the blank B against the upper runs of the outermost rear carrier belts 700, 700' until the trailing edge of the corresponding blank is advanced therebeyond to thereby insure that sufficient traction is maintained between the outermost rear carrier belts 700, 700' and the corresponding portions of the blank.

As heretofore stated, as each successive blank B is advanced by the rear carrier belts 700—702 and 700'—702' onto the rear portions of the top runs of the corresponding front carrier belts 705—707 and 705'—707' they pass beneath the improved pressure applying belts 720, 721, 720', 721' which, as heretofore stated, are also automatically driven by means independent of the means employed in driving the front and rear carrier belts, this separate driving means for the pressure applying belts 720, 721, 720', 721' constituting one of the important features of the present invention. Thus, the front group of carrier belts cooperates with the driven pressure applying belts to maintain alinement of the hems while advancing the blank to the sewing mechanisms 540, 540', notwithstanding the slack previously formed in the central portion of the blank.

As heretofore stated, the outermost of the front carrier belts 705, 705' and the complementary outermost pressure applying belts 720, 720' are so spaced that the overfolded portions of the blank are disposed between the said outermost front carrier belts 705, 705' and said outermost pressure applying belts 720, 720' during advancement of the blank and during which the inner or proximate edges of the overfolded portions of the hems are underfolded by the respective underfolding or double hem folding mechanisms 510, 511 in the manner heretofore described and as disclosed in Figures 15 and 17, to 22, inclusive, of said copending application.

As the leading edge of each successive blank approaches the front ends of the underfolding mechanisms 510, 511 (Figures 2, 2–A, 6, 7, 8, 9 and 10) the front and rear groups of belts stop momentarily and then the front carrier belts 705—707 and 705'—707' along with the complementary pressure-applying belts 720, 721, 720', 721' are subsequently caused to move at a slower rate of speed, substantially simultaneously with which the respective sewing machines 540, 540' are actuated to start the stitching of the respective hems. Of course, when the trailing end of each successive blank has moved forwardly beyond the lateral plane of the source of web material W shown in the right-hand upper portion of Figure 1, a succeeding cycle as heretofore described is initiated for positioning a succeeding blank upon the top runs of the rear group of carrier belts during the stitching of the hems on the succeeding blank.

It might be stated that the stop switches 545, 545' (Figures 2, 2–A and 12) are actuated by the leading edge of the corresponding portion of each successive blank to momentarily stop the corresponding front group of carrier belts at each side of the machine independently of those belts at the other side of the machine to thereby insure that the overfolded and underfolded hems on opposite side edges of each successive blank are positioned uniformly rearwardly of the respective sewing machines 540, 540'. Thereafter, the sewing machines, which are normally inoperative or idle are started and movement is then imparted to the front group of carrier belts at said relatively slow speed while the rear group of carrier belts remains stationary so that a succeeding blank B may be formed thereover, in the manner described, as the hems are being stitched on a preceding blank B.

As shown in Figures 5 to 10, inclusive, the overfolded and underfolded portions of each hem B–1 are maintained in proper relationship as they move past the needles N of the corresponding sewing machines 540, 540' by the outermost front carrier belts 705—705' and the complementary outermost pressure applying belts 720, 720' and it will be observed in Figures 5, 7 and 10 that the combination needle stripper and hem guide 725, which is identical to the combination needle stripper and hem guide 725', also assists in properly alining the underfolded inner edge of the corresponding hem B–1 longitudinally of the blank B during the stitching operation.

It follows that the leading end of each hem is properly alined with the body portion of the blank B as the leading end of each hem approaches the corresponding sewing machine 540 and, since the needle N reciprocates substantially vertically or may reciprocate at an angle relative to the vertical, depending upon the nature of the commercial type of sewing machine employed, the needle N penetrates the overfolded and underfolded portions of the hem B–1 for a longer period of time than it does the body portion of the blank B in the course of each reciprocation thereof and thereby tends to retard movement of the overfolded and underfolded portions of the hem as compared to the body portion of the bank B which would ordinarily cause the trailing end of the hem to protrude beyond the trailing edge of the body portion of the blank B.

However, as heretofore stated, preceding each relatively slow advancement of each succeeding blank, the pressure applying foot 804 at each side of the machine, which is normally in a lowered or operative position as shown in Figure 6, is raised to substantially the position shown in Figure 8; by energization of the corresponding solenoid 811, which solenoid 811 is energized by the high portion of cam 821 (Figures 2–C and 12) momentarily closing the switch 817.

The dwell of cam 821 is such that it will permit switch 817 to open a predetermined period after switch 583 is actuated. The switch 583 initiates said relatively slow movement of the forward or front group of carrier belts, the corresponding pressure applying belts and the discharge carrier belts 366, 366' as well as starting the sewing machines 540, 540'; and the coils 812, 812' of the solenoids 811, 811' (Figure 12) are again deenergized after some stiches have been formed in the leading portions of the corresponding hems B–1.

Referring again to Figures 6 and 8, it is apparent that, when the solenoid coil 812 is deenergized, the corresponding leaf spring member 805 urges the hold-back dog 801 downwardly to cause its pressure applying foot or clamping foot 804 to press the body of the blank against the base 842 of the corresponding sewing machine 540 immediately adjacent the inner underfolded edge of the corresponding hem B–1 and immediately adjacent the stem portion 796 of the needle stripper 725 as shown in Figures 6 and 7. Thus, the pressure of the foot portions, such as 804 (Figures 5, 6, 7 and 8), against the body of the blank frictionally retards movement of the body of the blank so that it will not advance at a rate faster than that in which the corresponding hems B–1 are permitted to advance as a result of reciprocation of the needles N of the sewing machines 540, 540' therethrough. It is apparent that cam 821 may be adjusted about shaft 208 to vary the time at which the blank retarding devices 726, 726' are actuated following movement of the leading edges of the hems past the needles N of the sewing machines 540, 540'.

It has already been stated how the cam 821 (Figures 2–C and 12) causes energization of the coils 812, 812' of the solenoids 811, 811' of the blank retarding devices 726, 726' upon the leading edge of each successive blank being positioned a predetermined distance closely adjacent and rearwardly of the sewing machines 540, 540' and preceding the actuation of the slow speed motors 580, 580', which drive the sewing machines 540, 540' and impart relatively slow movement to the front group of carrier belts and the corresponding complementary pressure applying belts 720, 721, 720', 721'. Now, the timing of the machine is such that the leading edge of each successive blank is spaced rearwardly of the trailing edge of each preceding blank as it is advanced so that the foot portions, such as 804 (Figures 6 and 8), on the blank retarding devices 726, 726' are raised out of engagement with a preceding blank at a time before the leading edge of the next succeeding blank approaches the needles N of the sewing machines 540, 540', and do not return to lowered or operative position until some stitches have been formed in the leading portion of the next succeeding blank in the manner heretofore described.

It is thus seen that I have provided an improved means to maintain the folded edge portions of each successive blank B in accurate relationship to the body of the blank throughout the movement of the blank through the machine, during the underfolding of the inner edges of the overfolded portions and during the stitching of the hems B–1, as embodied in the front group of carrier belts and the separately driven complementary pressure-applying belts, and it is seen that I have also provided means for retarding movement of the body portion of each successive blank relative to the overfolded and underfolded portions of the hems during the stitching operation to insure that the front and rear ends of the hems B–1 are disposed parallel with the respective leading and trailing edges of each successive blank throughout each stitching operation, thereby minimizing or even obviating the occurrence of "seconds" which have heretofore been caused by the formation of "ears" on opposite ends of the hems of bed sheets, blankets or other articles when produced on a machine such as that disclosed in said copending application.

In the drawings and specification there has been set forth a preferred embodiment of the invention and, although specific terms are employed, they are used in a generic and descriptive sense only, and not for purposes of limitation, the scope of the invention being defined in the claims.

I claim:
1. In a machine for making bed sheets or the like from a sheet of web material, said machine having means for drawing off from the web a portion thereof to form a blank, means for severing said blank from the web, a pair of sewing mechanisms disposed in substantially spaced relation to one of the longitudinal side edges of the blank thus formed and being spaced from each other a distance substantially the same as the end edges of the blank, and each sewing mechanism having a reciprocable sewing needle thereon; the combination of a plurality of carrier belts forming substantially continuous top belt runs across and above portions of which the web material is drawn in forming said blank, means for folding hems along opposite ends of the blank and for pressing said hems into engagement with some of said top belt runs to maintain traction between the hems and said top belt runs, driving means to impart movement to said top belt runs for moving the blank and guiding the hems toward the sewing mechanisms, other portions of some of said top belt runs extending past and adjacent the needles of said sewing mechanisms, said driving means being operable to continuously drive said other portions of the top belt runs during the sewing of the hems whereby the blank is moved continuously past the sewing mechanisms by contact with the corresponding portions of said top belt runs, and means for retarding movement of the blank independently of the hems thereof during the sewing of the hems to thereby prevent the blank proper form being advanced by the top belt runs at a speed exceeding that at which the hems thereon are permitted to be advanced as a result of reciprocation of the needles therethrough.

2. In a machine for making pliable rectangular articles, such as bed sheets and the like, said machine having a pair of sewing machines spaced from each other a distance substantially the same as opposite end edges of each article; the combination of a pair of spaced parallel outer carrier belts and a pair of spaced parallel inner carrier belts each spaced inwardly from a corresponding outer carrier belt, said carrier belts being adapted to successively support said articles thereacross, one at a time, means for folding hems on opposite ends of each successive article and above the respective outer carrier belts, outer and inner pressure applying belts disposed above and extending parallel to the respective outer and inner carrier belts and being disposed subsequent to said folding means, said carrier belts extending past said sewing machines, means for imparting movement to said carrier belts to advance each successive article to and between the carrier belts and the pressure applying belts and thence to the sewing machines, and means independent of said last-named means for imparting movement to said pressure applying belts at a speed corresponding to the speed of said carrier belts whereby the opposite end portions of the article are maintained perpendicular to its path of travel and the hems are advanced at the same speed as the article proper to insure proper alinement of the ends of the hems with opposite leading and trailing edges of the article.

3. In a machine for making pliable rectangular articles, such as bed sheets and the like, said machine having a pair of sewing machines spaced from each other a distance substantially the same as opposite end edges of each article and each sewing machine having a base and a reciprocable needle; the combination of a pair of spaced parallel outer carrier belts and a pair of spaced parallel inner carrier belts each spaced inwardly from a corresponding outer carrier belt, said carrier belts being adapted to successively support said articles thereacross, one at a time, first folding means for folding hems on opposite ends of each successive article and above the respective outer carrier belts, outer and inner pressure applying belts disposed above and extending parallel to the respective outer and inner carrier belts and being disposed subsequent to said first folding means, second folding means extending parallel to and adjacent each outer pressure applying belt for underfolding the edges of said hems, said carrier belts extending past said sewing machines, means for imparting movement to said carrier belts to advance each successive article to and between the carrier belts and the pressure applying belts and thence to the sewing machines, a stripper and guide element carried by each of the second folding means and overlying each corresponding base and having an aperture therethrough through which the corresponding needle passes in stiching the corresponding hem, means independent of said last-named means for imparting movement to said pressure applying belts at a speed correspondnig to the speed of said carrier belts whereby the opposite end portions of the article are maintained perpendicular to its path of travel and the hems are advanced at the same speed as the article proper to insure proper alinement of the leading ends of the hems with the leading edge of the article, and means operable automatically upon formation of some stitches in each hem by the sewing machines for applying tension to the article independently of its hems, but adjacent its hems to prevent the article proper from being advanced by the carrier belts at a speed exceeding that at which its hems are permitted to be advanced by the outer carrier belts as a result of reciprocation of the needles therethrough.

4. In a machine for making pliable rectangular articles, such as bed sheets and the like, said machine having a pair of sewing machines spaced from each other a distance substantially the same as opposite end edges of each article and each sewing machine having a base and a reciprocable needle thereon; the combination of a pair of spaced parallel outer carrier belts, a pair of spaced parallel inner carrier belts spaced between the outer carrier belts, said carrier belts having portions adapted to support said articles thereacross, one at a time, first folding means for folding hems on opposite ends of each successive article and above the respective outer carrier belts, outer and inner pressure applying belts disposed above and extending parallel to other portions of the respective outer and inner carrier belts and being disposed subsequent to said first-named portions of the carrier belts, said carrier belts extending past said sewing machines and wherein the outer carrier belts extend across and in contact with the upper surfaces of said bases and adjacent said needles, first driving means for imparting movement to said carrier belts to advance each successive article between the carrier belts and the pressure applying belts and thence to the sewing machines, second folding means extending parallel to and adjacent each outer pressure applying belt for underfolding the inner edges of said hems, said outer pressure applying belts also having portions thereof overlying the bases and disposed adjacent the needles of the corresponding sewing machines, a stripper element spaced closely above each sewing machine base and having an aperture therethrough through which the corresponding needle reciprocates, said stripper elements being arranged so the completely folded hems pass therebeneath from the second folding means, second driving means connected with said first driving means for imparting movement to said pressure applying belts at a speed corresponding to the speed of said carrier belts whereby the opposite end portions of the article are maintained perpendicular to its path of travel and the hems are advanced at the same speed as the article proper to insure alinement of the leading ends of the hems with the leading edge of the article, and an article tensioning means, operable automatically a predetermined interval after the leading ends of the hems have advanced beyond said needles, for pressing portions of said article proper adjacent the hems against the bases of the sewing machines adjacent the needles to cause said carrier belts and pressure applying belts to advance faster than the article proper to prevent the article from being advanced faster than its hems, as retarded by the needles, thereby insuring alinement of the leading and trailing ends of the hems with the respective leading and trailing edges of the article proper.

5. In a machine for making pliable rectangular articles, such as bed sheets and the like, said machine having a pair of sewing machines spaced from each other a distance substantially the same as opposite end edges of each article and each sewing machine having a base and a reciprocable needle thereon; the combination of a pair of spaced parallel outer carrier belts, a pair of spaced parallel inner carrier belts spaced between the outer carrier belts, said carrier belts having portions adapted to support said articles thereacross, one at a time, folding means for folding hems on opposite ends of each successive article and above the respective outer carrier belts, outer and inner pressure applying belts disposed above and extending parallel to other portions of the respective outer and inner carrier belts and being disposed subsequent to said folding means, said carrier belts extending past said sewing machines and wherein the outer carrier belts extend across and in contact with the upper surfaces of said bases and adjacent said needles, first driving means for imparting movement to said carrier belts to advance each successive article between the carrier belts and the pressure applying belts and thence to the sewing machines, said outer pressure applying belts also having portions thereof overlying the bases, and disposed adjacent the needles of, the corresponding sewing machines, a stripper element spaced closely above each sewing machine base and having an aperture therethrough through which the corresponding needle reciprocates, said stripper elements being arranged so portions of the hems pass therebeneath while adjacent portions of the hems are disposed between the proximal surfaces of the carrier belts and the pressure applying belts, second driving means connected with said first driving means for imparting movement to said pressure applying belts at a speed corresponding to the speed of said carrier belts whereby the opposite end portions of the article between each outer carrier belt and the adjacent inner carrier belt are maintained perpendicular to its path of travel and the hems are advanced at the same speed as the article proper to insure alinement of the leading ends of the hems with the leading edge of the article, an article tensioning device normally spaced above each base and means operable automatically a predetermined interval after the leading ends of the hems have advanced beyond said needles for moving said tensioning devices toward the respective bases to press portions of said article proper adjacent the hems against the bases of the sewing machines adjacent the needles to cause said carrier belts and pressure applying belts to advance faster than the article proper to prevent the article from being advanced faster than its hems, as retarded by the needles, thereby insuring alinement of the trailing ends of the hems with the trailing edge of the article proper.

6. In a machine for making pliable rectangular articles, such as bed sheets and the like, said machine having a pair of sewing machines spaced from each other a distance substantially the same as opposite end edges of each article and each sewing machine having a base and a reciprocable needle thereon; the combination of a pair of spaced parallel outer carrier belts, a pair of spaced parallel inner carrier belts spaced between the outer carrier belts, said carrier belts having portions adapted to support said articles thereacross, one at a time, folding means for folding hems on opposite ends of each successive article and above the respective outer carrier belts, outer and inner pressure applying belts disposed above and extending parallel to other portions of the respective outer and inner carrier belts and being disposed subsequent to said folding means, said carrier belts extending past said sewing machines and wherein the outer carrier belts extend across and in contact with the upper surfaces of said bases and adjacent said needles, first driving means for imparting movement to said carrier belts to advance each successive article between the carrier belts and the pressure applying belts and thence to the sewing machines, said outer pressure applying belts also having portions thereof overlying the bases, and disposed adjacent the needles of, the corresponding sewing machines, a stripper element spaced closely above each sewing machine base and having an aperture therethrough through which the corresponding needle reciprocates, said stripper elements being arranged so portions of the hems pass therebeneath while adjacent portions of the hems are disposed between the proximal surfaces of the carrier belts and the pressure applying belts, second driving means connected with said first driving means for imparting movement to said pressure applying belts at a speed corresponding to the speed of said carrier belts whereby the opposite end portions of the article between each outer carrier belt and the adjacent inner carrier belt are maintained perpendicular to its path of travel and the hems are advanced at the same speed as the article proper to insure alinement of the leading ends of the hems with the leading edge of the article, an article tensioning device normally spaced above each base, means operable automatically a predetermined interval after the leading ends of the hems have advanced beyond said needles for moving said tensioning devices toward the respective bases to press portions of said article proper adjacent the hems against the bases of the sewing machines adjacent the needles to cause said carrier belts and pressure applying belts to advance faster than the article proper to prevent the article from being advanced faster than its hems, as retarded by the needles, thereby insuring alinement of the trailing ends of the hems with the trailing edge of the article proper, supporting means on which the overlying portions of said pressure applying belts are mounted, and manually operable means for retracting and advancing said supporting means relative to the bases of said sewing machines to facilitate access thereto.

7. In a machine for making rectangular articles, such as bed sheets or the like, from a sheet of web material, said machine having means for successively severing blanks from the web, and a pair of sewing mechanisms disposed in substantially spaced relation to one of the longitudinal side edges of each successive blank thus formed and being spaced from each other a distance substantially the same as the end edges of each successive blank; the combination of a plurality of endless carrier belts forming substantially continuous top belt runs across and above portions of which each successive blank is formed, means for folding hems on opposite end edges of each successive blank, means operable automatically upon folding the hems to impart movement to said top belt runs for moving the blank with its folded hems toward the sewing mechanisms and transversely of the web, pressure applying belts positioned with bottom runs extending immediately above and in parallel relationship with other portions of said top belt runs subsequent to said folding means for maintaining traction between the hems and the top belt runs as the hems move out of engagement with said folding means, means for driving said pressure applying belts independently of the top belt runs to insure advancement of the hems at the same rate as that at which the body of each successive blank is advanced, certain top belt runs also extending through said sewing mechanisms, and portions of said pressure applying belts also extending at least partially through said sewing mechanisms for feeding the blank through the same for sewing the hems.

8. In a machine for making rectangular articles, such as bed sheets or the like, from a sheet of web material, said machine having means for successively severing blanks from the web, and a pair of sewing mechanisms disposed in substantially spaced relation to one of the longitudinal side edges of each successive blank thus formed and being spaced from each other a distance substantially the same as the end edges of each successive blank; the combination of a plurality of endless carrier belts forming substantially continuous top belt runs across and above portions of which each successive blank is formed, means for folding hems on opposite end edges of each successive blank, means operable automatically upon folding the hems to impart movement to said top belt runs for moving the blank with its folded hems toward the sewing mechanisms and transversely of the web, pressure applying belts positioned with bottom runs extending immediately above and in parallel relationship with other portions of said top belt runs subsequent to said folding means for maintaining traction between the hems and the top belt runs as the hems move out of engagement with said folding means, means for driving said pressure applying belts independently of the top belt runs to insure advancement of the hems at the same rate as that at which the body of each successive blank is advanced, certain top belt runs also extending through said sewing mechanisms, and portions of said pressure applying belts also extending at least partially through said sewing mechanisms for feeding the blank through the same for sewing the hems, and manually operable means for retracting said portions of the pressure applying belts relative to the sewing mechanisms to facilitate repair of the sewing mechanisms.

9. In a machine for making bed sheets or the like from a sheet of web material, said machine having means for successively severing predetermined lengths from the web material to form blanks therefrom, a pair of sewing mechanisms disposed in spaced relation to one of the longitudinal side edges of each successive blank thus formed and being spaced from each other a distance substantially the same as the end edges of each successive blank, said sewing mechanisms each including a base and a reciprocable needle; the combination of a plurality of carrier belts forming substantially continuous top belt runs across and above portions of which each successive blank is formed, means operable upon formation of each blank for folding hems along the ends of the blank and said hems defining a body of said blank therebetween, pressure applying belts positioned above and extending parallel to portions of said top belt runs and being disposed to one side of the portions of said top belt runs upon which said blanks are formed, means operable automatically upon formation of each successive blank for imparting movement to said top belt runs for moving the blank and guiding the hems toward the sewing mechanisms, means operable independently of and simultaneously with said last-named means for imparting movement to the pressure applying belts at a speed corresponding to the speed of said top belt runs, at least some of said pressure applying belts being positioned above portions of the hems folded along the ends of each successive blank and having their bottom runs engaging said hems whereby the hems are advanced at the same speed as the body of the blank, each of said sewing mechanism bases having a groove in its upper surface adjacent the needle thereof, portions of some of said top belt runs extending through said grooves for feeding and guiding the hems past said needles, and means operable automatically upon a predetermined portion at the leading edge of each successive blank being advanced past the sewing needles for resiliently pressing the blank against the bases of the sewing mechanisms and adjacent said needles to thereby maintain the blank taut and to restrain the blank from being advanced by the corresponding portions of the top belt runs at a speed greater than the speed at which the hems are permitted to be advanced due to reciprocation of the sewing needles therethrough.

10. In a structure according to claim 9, wherein said sewing mechanisms each has a portion spaced above and overlying the base thereof; means supporting portions of said pressure applying belts between the overlying portions of the sewing mechanisms and the bases thereof for pressing the hems against the corresponding top belt runs adjacent the needles of the sewing mechanisms, and manually operable means for retracting said last-named means to withdraw the same from between the overlying portions and the bases of the sewing mechanisms to thereby slacken the corresponding pressure applying belts and to facilitate access to the sewing mechanisms.

11. In a machine for making rectangular articles, such as bed sheets or the like, from a sheet of web material, said machine having means for drawing off from the web material a portion thereof to form a blank, means for severing said blank from the web material and a pair of sewing mechanisms disposed in substantially spaced relation to one of the longitudinal side edges of the blank thus formed and being spaced from each other a distance substantially the same as the end edges of the blank thus formed, the combination of a plurality of endless carrier belts forming substantially continuous outer top belt runs adjacent the end edges of the blank and also forming substantially continuous inner top belt runs spaced inwardly from the respective outer top belt runs, said web material being drawn across and above portions of said top belt runs in forming said blanks, means for folding hems on the end edges of each successive blank above portions of said outer top belt runs, means operable automatically upon said hems being formed on each successive blank to impart movement to all of said top belt runs for moving the blank towards the sewing mechanisms transversely of the web material, said machine having means for forming a transverse slack in the central portion of each portion of the web material drawn therefrom to form said blank, outer endless pressure applying belts disposed above and in parallel relationship to other portions of said outer top belt runs for pressing the previously folded hems against the body of the blank as the blank is advanced by the outer top belt runs, inner pressure applying belts disposed above and extending in parallel relation to other portions of said inner top belt runs and being adapted to press corresponding portions of the blank against said other portions of the inner top belt runs during the advance of the blank to the sewing mechanisms, and means for driving the pressure applying belts at the same surface speed as but independently of the top belt runs whereby the inner pressure applying belts cause the portions of the blank disposed between each of the inner pressure applying belts and the corresponding outer pressure applying belts to move in a straight path to prevent bowing or skewing of said last-named portions of the blank as the blank is advanced through the sewing mechanisms and to insure proper alinement of the hems with the body of the blank during sewing of the hems.

12. In a machine for forming hems on a substantially rectangular blank, said machine having a pair of sewing mechanisms spaced from each other a distance substantially the same as the distance between the opposite edges of the blank and each mechanism having a reciprocable needle; the combination of a pair of spaced outer carrier belts forming top runs which extend past and closely adjacent the respective needles, an inner carrier belt spaced inwardly from each outer carrier belt, means for driving said carrier belts to advance a blank thereon toward and past the sewing mechanisms, means for underfolding said opposite edge portions of said blank as it moves toward said sewing mechanisms, a driven pressure applying belt disposed above and parallel to each carrier belt for pressing the blank against the respective carrier belts, and means operable automatically upon a predetermined length of each underfolded edge portion being sewed for frictionally retarding movement of said blank relative to its underfolded edge portions and relative to said carrier belts under predetermined pressure and adjacent each needle.

13. In a machine for making hems on rectangular articles, said machine having a pair of spaced sewing mechanisms each provided with a reciprocable needle thereon; the combination of means to continuously advance the article, by frictional engagement therewith, toward and past the sewing mechanisms, means for folding opposite edge portions of the article as it is advanced toward said sewing mechanisms, normally inoperative retarding means disposed adjacent each needle for retarding movement of said article relative to the portions thereof, said advancing means comprising a first set of at least two spaced parallel endless carrier belts on one side of said machine, a second set of at least two spaced parallel endless carrier belts on the other side of the machine, first separate means for driving each set of carrier belts, first and second sets of pressure applying belts disposed above and parallel to the respective first and second sets of carrier belts, second separate means for driving each set of pressure applying belts at the same speed as the carrier belts for maintaining the leading edge of the folded portions in alinement with the leading edge of the article, means controlled by the leading edge of the article for stopping said first and second sets independently of each other as the hems approach the sewing mechanisms, means for then starting said first and second sets, and means operable automatically a predetermined time after starting said first and second sets to actuate said retarding means.

14. In a machine for hemming two opposed ends of a rectangular blank, a pair of sewing mechanisms for sewing hems on the ends of the blank, first feeding means disposed adjacent each end of the blank for feeding the blank toward the sewing machine, second feeding means in substantial alinement with the first feeding means for feeding the ends of the blank past the sewing mechanisms, said second feeding means including outer top and bottom horizontally spaced complementary endless belts between which the ends of the blank pass and inner top and bottom horizontally spaced complementary endless belts spaced between said outer belts, means for driving each of said complementary endless belts, means engageable by the leading edge of the blank near each end thereof for stopping the feeding of each end of the blank independently of the other end of the blank, and means automatically operable after the leading edge of the blank has been arrested for activating the second feeding means.

15. In a machine for hemming two opposed ends of a rectangular blank, a pair of sewing mechanisms for sewing hems on the ends of the blank, first feeding means disposed adjacent each end of the blank for feeding the blank toward the sewing machines, second feeding means in substantial alinement with the first feeding means for feeding the ends of the blank past the sewing mechanisms, said second feeding means including outer top and bottom horizontally spaced complementary endless belts between which the ends of the blank pass and inner top and bottom horizontally spaced complementary endless belts spaced between said outer belts, means for driving each of said complementary endless belts, means engageable by the leading edge of the blank near each end thereof for stopping the feeding of each end of the blank independently of the other end of the blank, means automatically operable after the leading edge of the blank has been arrested for activating the second feeding means independently of the first feeding means, and means controlled by the trailing edge of the blank near each end thereof for again stopping the feeding of each end of the blank independently of the other end of the blank.

16. In a machine for hemming two opposite ends of a rectangular blank, said machine having means for successively severing predetermined lengths from a source of web material to form blanks, and a pair of spaced normally inactive sewing machines spaced from the point at which said blanks are formed; the combination of carrier belts forming substantially continuous top belt runs onto first portions of which said blanks are deposited as formed, and being spaced from each other in order to be engaged by opposite end portions of each successive blank, means to drive said top belt runs after each blank is deposited thereon, said top belt runs having second other portions extending past the respective sewing machines to cause opposite ends of the blank to be sewn simultaneously, said top belt runs also having third other portions extending parallel to the second portions and being spaced inwardly therefrom, pressure applying belts disposed above and extending in parallel relation to said second and third portions of the top belt runs for pressing the blank against the corresponding top belt runs whereby opposite end portions of the blank are maintained perpendicular to the path of travel of the blank, means controlled by the leading edge of each of said last-named opposite end portions of the blank for separately stopping the corresponding top belt runs and pressure applying belts to position the leading edge of opposite ends of the blank uniformly relative to said sewing machines, means for again driving said second and third portions of the top belt runs and the corresponding pressure applying belts after the leading edge of opposite ends of the blank have reached the latter position, and means then operable for activating the sewing machines.

17. In a machine for making hems on rectangular articles, said machine having a pair of spaced sewing mechanisms each provided with a reciprocable needle thereon; the combination of means to continuously advance the article, by frictional engagement therewith, toward and past the sewing mechanisms, means for folding opposite edge portions of the article as it is advanced toward said sewing mechanisms, means disposed adjacent each needle for retarding movement of said article relative to the folded portions thereof and relative to said advancing means, said advancing means comprising a plurality of spaced parallel continuously driven carrier belts, at least two of said carrier belts at each side of the machine being so disposed as to support and advance a narrow portion of the article adjacent each fold, a pressure applying belt disposed above and extending parallel to each of said two carrier belts on each side of the machine, for maintaining said article in engagement with the carrier belts, separate driving means for driving the two carrier belts and the corresponding pressure applying belts at each side of the machine, means engageable by the leading edge of each of said narrow portions of the article for stopping the driving means at that side of the machine independently of the driving means at the other side of the machine whereby both of said narrow portions come to rest a predetermined distance from the sewing mechanisms independently of each other, means for again starting said driving means, and other means engageable by each of said narrow portions for stopping the corresponding driving means independently of each other as the trailing end of each folded portion passes the corresponding sewing mechanism.

18. In an apparatus having a stationarily mounted sewing mechanism for sewing a hem along a folded side edge of a blank including a reciprocable needle operable to repeatedly penetrate the folded side edge and the portion of the blank against the folded side edge in a manner to repeatedly impose a momentary drag on the folded side edge relative to the blank as the blank is advanced continuously past the sewing mechanism; a combination therewith, first advancing means for engaging the portion of the blank disposed against said folded side edge adjacent the sewing mechanism for continuously advancing said portion of the blank past the sewing mechanism at a predetermined rate, second advancing means for engaging another portion of the body of the blank spaced inwardly from the folded side edge for continuously advancing such other portion of the body of the blank at the same predetermined rate as that portion of the blank against said folded side edge is advanced, and retarding means disposed adjacent the sewing mechanism for engaging a portion of the body of the blank adjacent the folded side edge to impose a drag thereon substantially equal in effect to the drag imposed on the folded side edge by said needle.

19. In an apparatus having a stationarily mounted sewing mechanism for sewing a hem along a folded side edge of a blank including a reciprocable needle operable to repeatedly penetrate the folded side edge and the corresponding portion of the body of the blank disposed against the folded side edge in a manner to repeatedly impose a momentary drag on the folded side edge of the blank relative to the corresponding portion of the blank as the blank is advanced continuously past the sewing mechanism; in combination therewith, a first carrier belt and an overlying pressure belt cooperating therewith for engaging the folded side edge of the blank and said corresponding portion of the body of the blank adjacent the sewing mechanism to advance the folded side edge and said corresponding portion past the sewing mechanism, a second carrier belt and an overlying pressure belt cooperating therewith for engaging an inner portion of the body of the blank to advance such inner portion past the sewing mechanism, means for driving the belts to continuously advance the folded side edge, said corresponding portion of the blank and said inner portion of the blank at the same rate past the sewing mechanism, and retarding means disposed adjacent the sewing mechanism for engaging a portion of the body of the blank adjacent the folded side edge to impose a drag thereon comparable to the drag imposed on the folded side edge by said needle.

References Cited in the file of this patent

UNITED STATES PATENTS

| | | |
|---|---|---|
| 1,026,547 | Adair et al. | May 14, 1912 |
| 2,053,257 | Anderson | Sept. 8, 1936 |
| 2,411,637 | Ramage | Nov. 26, 1946 |
| 2,546,831 | Newell | Mar. 27, 1951 |